United States Patent
Sotemann et al.

(10) Patent No.: US 11,014,096 B2
(45) Date of Patent: May 25, 2021

(54) INDIRECT FLOTATION PROCESS FOR MANUFACTURING WHITE PIGMENT CONTAINING PRODUCTS

(71) Applicant: OMYA INTERNATIONAL AG, Oftringen (CH)

(72) Inventors: Jorg Sotemann, Rheinfelden (DE); Jorg Maier, Villach (AT); David Gilbert, Villach (AT); Tomi Matti Juhani Niitti, Elnesvagen (NO)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 16/638,911

(22) PCT Filed: Aug. 8, 2018

(86) PCT No.: PCT/EP2018/071491
§ 371 (c)(1),
(2) Date: Feb. 13, 2020

(87) PCT Pub. No.: WO2019/034491
PCT Pub. Date: Feb. 21, 2019

(65) Prior Publication Data
US 2020/0188935 A1  Jun. 18, 2020

Related U.S. Application Data

(60) Provisional application No. 62/549,047, filed on Aug. 23, 2017.

(30) Foreign Application Priority Data

Aug. 16, 2017  (EP) .................................. 17186527

(51) Int. Cl.
| | |
|---|---|
| B03D 1/02 | (2006.01) |
| B03D 1/004 | (2006.01) |
| C01F 1/00 | (2006.01) |
| C09C 3/04 | (2006.01) |
| B03D 1/01 | (2006.01) |
| B03D 1/016 | (2006.01) |

(52) U.S. Cl.
CPC .............. B03D 1/0043 (2013.01); C01F 1/00 (2013.01); C09C 3/04 (2013.01); B03D 1/011 (2013.01); B03D 1/016 (2013.01); B03D 1/02 (2013.01); B03D 2201/02 (2013.01); B03D 2203/005 (2013.01); C01P 2006/80 (2013.01)

(58) Field of Classification Search
CPC .......... B03D 1/02; B03D 1/011; B03D 1/016; B03D 1/0043; B03D 2201/02; B03D 2203/005; C01F 1/00; C09C 3/04; C01P 2006/80
USPC ........................................................ 209/166
See application file for complete search history.

(56) References Cited

U.S. PATENT DOCUMENTS

| | | | |
|---|---|---|---|
| 4,606,916 A | 8/1986 | Hofinger et al. | |
| 4,995,965 A | 2/1991 | Mehaffey et al. | |
| 5,261,539 A | 11/1993 | Hancock et al. | |
| 5,720,873 A | 2/1998 | Klingberg et al. | |
| 2005/0189113 A1 | 9/2005 | Cassidy et al. | |
| 2019/0046994 A1* | 2/2019 | Jorda | B03D 1/011 |
| 2019/0233652 A1* | 8/2019 | Sotemann | D21H 17/68 |

FOREIGN PATENT DOCUMENTS

| | | |
|---|---|---|
| CN | 101337204 A | 1/2009 |
| CN | 101816981 A | 9/2010 |
| EP | 0035263 A2 | 9/1981 |
| EP | 1584674 A1 | 12/2005 |
| EP | 1806392 A1 | 11/2007 |
| EP | 1876224 A1 | 1/2008 |
| EP | 2700680 A1 | 2/2014 |
| EP | 3208314 A1 | 8/2017 |
| FR | 3047674 A1 * | 8/2017 |
| WO | 9726995 A1 | 7/1997 |
| WO | 0062937 A1 | 10/2000 |
| WO | 2008089906 A1 | 7/2008 |
| WO | 20088084391 A1 | 7/2008 |
| WO | 2010051895 A1 | 3/2010 |
| WO | 2011147855 A2 | 1/2011 |
| WO | 2012089649 A1 | 7/2012 |
| WO | 2015091308 A1 | 6/2015 |

OTHER PUBLICATIONS

International Search Report and Written Opinion for International Application No. PCT/EP2018/071491, dated Oct. 12, 2018, 12 pages.

* cited by examiner

Primary Examiner — Thomas M Lithgow
(74) Attorney, Agent, or Firm — Fay Sharpe LLP

(57) ABSTRACT

The present invention concerns a process for manufacturing white pigment containing products. The white pigment containing products are obtained from at least one white pigment and impurities containing material via froth flotation.

25 Claims, No Drawings

INDIRECT FLOTATION PROCESS FOR MANUFACTURING WHITE PIGMENT CONTAINING PRODUCTS

The present invention relates to a process for manufacturing white pigment containing products and, more particularly, relates to the field of technologies implemented in order to separate white pigments and impurities by froth flotation for the manufacture of white pigment containing products.

Pigments are generally known as materials that change the colour of reflected or transmitted light as the result of wavelength-selective absorption. This physical process differs from fluorescence, phosphorescence, and other forms of luminescence, in which a material emits light. Pigments are used for colouring e.g. paint, ink, plastic, fabric, cosmetics, food and other materials. Most pigments used are dry colourants, usually ground into a fine powder.

White pigments take a special position in the field of pigments due to their industrial relevance. For example, in the paper industry in Europe more than 10 million tonnes per year of white pigments are used. White pigments are also used in paints and coatings. Especially when manufacturing dispersion paints, white pigments are the base colour in the tinting system.

Naturally occurring white pigments are usually obtained by mining. However, generally, such white pigments contain impurities which induce discolouration such as, for example, greyness or yellowness. Furthermore, these impurities may affect the properties of the white pigments and, thus, lead to significant disadvantages in their use. A high amount of impurities such as, for example, silicates within the white pigments might increase the abrasive properties. Therefore, the impurities and the white pigments have to be separated from one another to obtain a white pigment containing product that is not, or merely marginally, contaminated with impurities.

It is known in the prior art to separate impurities from white minerals by physico-chemical separation. The physico-chemical separation process involves firstly grinding the metamorphic or sedimentary rock and then subjecting the resulting white pigment and impurities containing material to conventional froth flotation in an aqueous environment. Conventional froth flotation is a highly versatile method known in the prior art for physico-chemical separation of particles based on differences in the ability of gas bubbles to adhere selectively to specific surfaces in an aqueous suspension containing the white pigment and impurities containing material. The white pigments with attached air bubbles are then carried to the surface and are removed, while the impurities that remain completely wetted stay in the liquid phase.

As set out above, the basis of conventional froth flotation is the difference in the wettability of the white pigments and the impurities. White pigments can either be naturally hydrophobic, but in general the hydrophobicity is induced by chemical treatments. Chemical treatments to render a surface hydrophobic are essentially methods for coating a particle surface with a layer of suitable compounds.

However, conventional flotation has a significant disadvantage: As mentioned before, chemical treatments as collector agents are used to render the surface of the white pigments hydrophobic to separate these particles by gas bubbling. These collector agents are adsorbed on the surface of the white pigments and, therefore, modify the properties of the pigments. However, this modification may be undesirable in the following use of the white pigments in paper, plastics, paint, coatings, concrete, cement, cosmetic, water treatment, food, pharma, ink and/or agriculture applications, wherein preferably the white pigment containing product is used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces. Furthermore, the direct flotation of the desired white pigments is disadvantageous due to quality and economical reasons.

Alternatively, one may consider to use reverse/indirect froth flotation to separate the white pigments and the impurities. In contrast to conventional flotation, in which the desirable white pigments are directly floated and collected from the produced froth, reverse (indirect) flotation aims to have the undesirable impurities preferentially floated and removed, leaving behind a suspension that has been concentrated in respect to the desirable white pigments. Also during reverse flotation collector agents are used that render the impurities hydrophobic.

Corresponding methods that use collector agents in reverse froth flotation are already known, one class of collector agents are esterquats.

U.S. Pat. No. 3,990,966 refers to a wet process for purifying calcite ore by grinding and forming a slurry of calcite ore, separating said impurities from the calcite slurry by flotation of the impurities therefrom in the presence of a flotation agent, classifying the resultant calcite slurry, settling the classified calcite in a thickener and drying the product. As flotation agent a cationic surfactant selected from the group consisting of (a) 1-hydroxyethyl-2-heptadecenyl glyoxalidine, (b) 1-hydroxyethyl-2-alkylimidazolines and (c) salt derivatives of said imidazoline, wherein the alkyl portion of the imidazoline is the alkyl portion of a fatty acid of such length that said surfactant is liquid as used.

CA 1 187 212 relates to a process for purifying a carbonate ore containing silicates by flotation, wherein the ore is subjected to grinding to a fineness sufficient to release the impurities. The collector is a cationic reactant selected from the group consisting of the following quaternary amines: a) dimethyl dialkyl with 8 to 16 carbon atoms in the alkyl radicals, said alkyl radicals being saturated or unsaturated aliphatic, normal or branched; b) dimethyl alkyl benzyl with 10 to 22 carbon atoms in the radical alkyl which is a normal aliphatic; c) bis-imidazoline containing 12 to 18 carbon atoms in the alkyl radicals which are normally saturated or unsaturated aliphatic; d) salts derived from quaternary amines a), b) and c). WO 2008/084391 A1 refers to a process for purification of calcium carbonate-comprising minerals comprising at least one flotation step, characterized in that this step implements at least one quaternary imidazoline methosulphate compound as collector agent.

WO 2008/089906 A1 relates to a process for the flotation of non-sulphidic minerals or ores, in which crushed crude minerals or ores are mixed with water and a collector to form a suspension. Air is introduced into the suspension in the presence of a reagent system and a floated foam containing said non-sulphidic mineral or ores formed therein along with a flotation residue comprising the gangue, wherein the improvement comprises using as the collector polymeric esterquats, obtainable by reacting alkanolamines with a mixture of monocarboxylic acids and dicarboxylic acids and quaternising the resulting esters in known manner, optionally after alkoxylation.

WO 2011/147855 A2 refers to the use of a polymeric quaternary ester product as a collector in a froth flotation process, to a method for froth flotation utilizing the polymeric quaternary ester, to the polymeric quaternary ester as such, and to methods for the production of the polymeric quaternary ester.

WO2010/051895 A1 relates to the use of a composition of A) at least one quaternary ammonia compound comprising at least one organic radical bonded to the ammonia nitrogen atom and optionally comprising heteroatoms and having 1 to 36 carbon atoms, and B) at least one amine alkoxylate ester of formula (1) or a salt thereof, where A, B are, independently of each other, a C2- through C5-alkylene radical R1, a C8- through C24-alkyl radical or alkenyl radical R2, R3, R4 independent of each other, H, or a C8- through C24-acyl radical, with the stipulation that at least one of the radicals R2, R3 or R4 stands for a C8- through C24-acyl radical, and x, y, z, independently of each other, stand for a whole number from 0 through 50, with the stipulation that x+y+z is a whole number from 1 through 100, in quantities of 10 through 5 000 g/tonne of ore as a collector in silicate flotation.

EP 2 659 028 A1 relates to the use of a product obtainable by the reaction of a fatty acid, or mixture of acids, having the formula R1COOH (I); and a dicarboxylic acid or a derivative thereof having the formula (IIa) or (IIb) with an alkoxylated fatty amine having the formula (III) or a partial or wholly quaternised derivative thereof; optionally said reaction between the fatty acid, the dicarboxylic acid and the alkoxylated fatty amine is being followed by a further reaction step wherein part or all of the nitrogen atoms are quaternised by reaction with an alkylating agent R5X; as a corrosion inhibitor for metal surfaces.

U.S. Pat. No. 5,720,873 refers to a method of cleaning calcium carbonate ore containing silicate impurities, in which a froth-flotation process is performed in the presence of a specific cationic collector.

AU 2167883 A relates to froth flotation of sized coal effected in an aqueous medium containing a fuel oil collector and a conditioner comprising a product formed by condensing 1 mole of an alkanolamine (I) with ≥0.8 mol of a fatty acid or fatty acid ester, or an acid derivative of such a product.

WO 00/62937 A1 refers to a froth flotation process in which silicates are separated from an iron ore in the presence of a collector containing a specific quaternary ammonium compound. This collector has a high selectivity to concentrate silicates in the froth product, while a high yield of iron minerals is maintained in the bottom concentrate or concentrates.

WO 97/26995 A1 relates to the use of so-called quaternary esters as an aid for flotation of non-sulfidic minerals.

U.S. Pat. No. 4,995,965 refers to a process for purifying calcium carbonate ore by the removal of silicate impurities from the ore by reverse flotation. The process achieves high yields and low acid insoluble content of the calcium carbonate product by employing specific collectors.

CN 101337204 A relates to bi-quaternary ammonium compounds in silicate mineral flotation, and a specific collector which applies a specific bi-quaternary ammonium compound in bauxite or ironstone reverse flotation desiliconization.

CN 101816981 A refers to a specific environmentally-friendly amine cationic collector and a using method thereof.

EP 1 584 674 A1 relates to an esterquat concentrate suitable for production of fabric softeners at lower temperatures comprising a) an esterquat compound; b) an organic solvent; c) water; d) a pH modifier.

EP 1 806 392 A1 refers to aqueous compositions containing a specific esterquat or mixtures of specific esterquats.

EP 1 876 224 A1 relates to a stable, homogenous and viscous softener formulation which contains less than 50% by weight of a specific esterquat compound.

US 2005/0189113 A1 refers to acidic treatment fluids that comprise an acid fluid and an ester-containing quaternary ammonium compound ("esterquat") and methods of their use.

EP 2 700 680 A1 relates to a process for manufacturing white pigment containing products. The white pigment containing products are obtained from at least one white pigment and impurities containing material via froth flotation using a specific collector agent.

U.S. Pat. No. 4,606,916 refers to specific quaternary oxalkylated polyesters prepared from oxalkylated fatty amines by polycondensation with a dicarboxylic acid and subsequent reaction with an alkylene oxide and a carboxylic acid or a mineral acid or with a quaternizing agent such as methyl chloride, are described. The compounds are suitable for use as cosmetic active compounds, in particular for cosmetic care of the hair.

EP 0 035 263 A2 relates to specific textile softeners which are polyesters containing tertiary amino groups or salts thereof with lower carboxylic acids, for example acetic acid or glycolic acid, and mineral acids.

Also known are unpublished patent applications EP 16 156 003.2 and EP 16 155 963.8 that also refer to a process for manufacturing white pigment containing products.

However, the prior art methods for manufacturing products by reverse froth flotation have numerous disadvantages. The use of such collector agents is very expensive.

Additionally, many of the known collector agents cause uncontrolled foaming in the reverse froth flotation process. Furthermore, many of the reverse froth flotation processes are limited in that they are selective, i.e. a significant part of the desired product is floated together with the impurities. Also, a great number of the collector agents used so far is considered to be aquatic and environmentally toxic. A further disadvantage of the known collector agent is that they decompose under flotation conditions and therewith loose efficiency.

Therefore, there is a need for an improved method for producing white pigments by flotation, which method avoids or reduces the problems described above in relation to the known methods. Such improved method for manufacturing white pigments from a white pigment and impurities containing material should especially be an easy to handle and ecological method. Also, the effectiveness should be satisfactory.

At least some of the foregoing objects have been solved by the present invention.

According to one aspect of the present invention a process for manufacturing white pigment containing products is provided, characterised in that said process comprises the following steps:

a) providing at least one white pigment and impurities containing material;

b) providing at least one collector agent selected from the group consisting of compounds of formula (1):

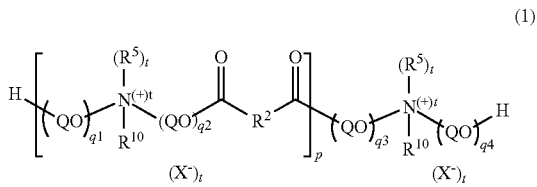

(1)

wherein $R^2$ is selected from the group consisting of:
  i) a direct bond,
  ii) a $C_1$-$C_{20}$, linear or branched, saturated or unsaturated hydrocarbon chain optionally substituted by one or more —OH group(s), a substituted alkylene radical wherein said alkylene radical is substituted by 1 or 2 —OH groups, an alkenylene radical having from 1 to 20 carbon atoms, and a substituted alkenylene radical, wherein said alkenylene radical is substituted by 1 or 2 methyl and/or methylene groups,
  iii) a cycloalkylene,
  iv) a cycloalkenylene and
  v) an arylene group $R^5$ is a $C_1$-$C_6$ hydrocarbyl group,
X is a leaving group,
t is 0 or 1,
p is an integer in the range from 1 to 15,
QO is an alkyleneoxy group containing from 2 to 4 carbon atoms,
$q_1$, $q_2$, $q_3$, $q_4$, are independently from each other an integer in the range from 1 to 20,
$R^{10}$ is independently from each other selected from the group consisting of $R^7$ and $R^{11}$, with the proviso that at least one of the $R^{10}$ groups is $R^7$ and at least one other of the $R^{10}$ groups is $R^{11}$, wherein
  $R^7$ is selected from the group consisting of a hydrocarbyl group having 1 to 7 carbon atoms, an aryl or an arylalkyl group, a group of formula H—(OA")$_v$-, wherein v represents an integer of between 1 and 20 and A"O represents an alkyleneoxy group containing from 2 to 4 carbon atoms, HO(CH$_2$)$_q$— and a group of formula (2)

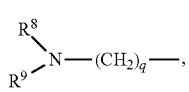

(2)

wherein $R^8$ and $R^9$, independently from each other, are selected from among a hydrocarbyl group having 1 to 6 carbon atoms, or $R^8$ and $R^9$, together with the nitrogen atom to which they are linked form a 5-, 6- or 7-atom ring, optionally bearing one or more heteroatom(s) chosen from among oxygen, nitrogen or sulphur and wherein q is an integer in the range from 1 to 10
  $R^{11}$ is $R^1$-(G)$_y$- wherein $R^1$ is selected from the group consisting of a hydrocarbyl group having 8 to 24 carbon atoms and a group of formula $R^4$—O-(A'O)$_w$-T-, wherein $R^4$ is a hydrocarbyl group having from 8 to 24 carbon atoms, w is an integer in the range from 0 to 20, A'O is an alkyleneoxy group having from 2 to 4 carbon atoms, T is an alkylene group having from 1 to 6 carbon atoms, y is an integer from 0 to 5, and G represents a group of formula (3):

(3)

wherein
    B is selected from the group consisting of $C_1$-$C_4$ alkyl, aryl and arylalkyl group,
    s is 1, 2 or 3 and
    $R^5$, X and t are as defined above, and the group (CH$_2$)$_s$ is a spacer between the two nitrogen atoms to which it is linked,
c) mixing said white pigment and impurities containing material of step a) and said collector agent of step b) in an aqueous environment to form an aqueous suspension;
d) passing gas through the suspension formed in step c);
e) recovering the white pigment containing product by removing the white pigment bearing phase from the aqueous suspension obtained after step d).

The inventors surprisingly found that the process for manufacturing white pigment containing products from at least one white pigment and impurities containing material and at least one collector agent according to formula (1)

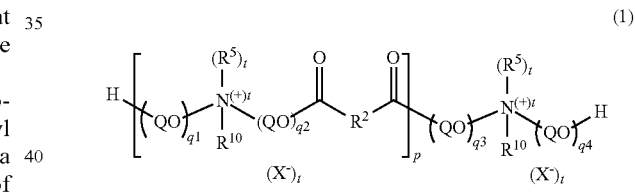

(1)

is advantageous because the aforementioned collector agents effectively bind much more effectively to the surface of the impurities than to the surface of the white pigments.

Therefore, the inventive flotation process is very effective in comparison with known prior art processes. The white pigment containing products obtained from the inventive process show good brightness and have a low yellow index.

A second aspect of the present invention relates to the use of the white pigment bearing phase obtainable by the inventive process in paper, plastics, paint, coatings, concrete, cement, cosmetic, water treatment, food, pharma, ink and/or agriculture applications, wherein preferably the white pigment containing product is used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

Advantageous embodiments of the present invention are defined in the corresponding sub-claims.

According to one embodiment, the process involves an indirect flotation step leading to the formation of a froth containing the impurities and a white pigment bearing phase with the white pigment containing product.

According to another embodiment, the white pigment is a white mineral pigment, preferably selected from the group consisting of natural calcium carbonate or ground calcium carbonate, calcium carbonate-comprising mineral material, dolomite, barite, and mixtures of the foregoing.

According to another embodiment, the white mineral pigment is an alkaline earth metal carbonate, preferably a calcium carbonate and most preferably ground calcium carbonate.

According to another embodiment, the white pigment containing material comprises impurities selected from the group consisting of base metal sulphides, iron oxides, graphite, silicates and mixtures thereof.

According to another embodiment, the silicate is selected from the group consisting of quartz, mica, amphibole, feldspar, clay mineral and mixtures thereof and preferably is quartz.

According to another embodiment, the silicate is a white coloured silicate selected from the group consisting of wollastonite, kaolin, kaolinitic clay, montmorillonite, talc, diatomaceous earth, sepiolite and mixtures thereof.

According to another embodiment, the amount of white pigment in the white pigment and impurities containing material of step a) is from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

According to another embodiment, the ratio of white pigment:impurities in the white pigment and impurities containing material of step a) is from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

According to another embodiment, the white pigment and impurities containing material of step a) has a weight median grain diameter in the range of from 1 to 5 000 μm, preferably of from 3 to 700 μm, more preferably of from 5 to 500 μm and most preferably of from 10 to 80 μm or from 100 to 500 μm.

According to another embodiment, the compound of formula (1) is characterized in that $R^2$ is selected from the group consisting of an alkylene radical of formula —$(CH_2)z$, in which z is an integer from 1 to 20, preferably from 1 to 10, preferably from 2 to 6, and most preferably 4 and an alkenylene radical having from 1 to 10 carbon atoms, and/or $R^5$ is selected from the group consisting of a $C_1$-$C_4$ alkyl group, phenyl and phenylalkyl, and preferably is a benzyl, and/or X is selected from the group consisting of halogens, sulphates and carbonates, and/or p is an integer in the range from 1 to 10, preferably from 1 to 5, and/or QO is an alkyleneoxy group containing 2 or 3 carbon atoms, preferably containing 2 carbon atoms, and/or $q_1$, $q_2$, $q_3$, $q_4$, are independently from each other an integer of between 1 to 10, more preferably between 1 to 6, and most preferably between 1 to 4, and/or $R^7$ is selected from the group consisting of a hydrocarbyl group having 1 to 6 carbon atoms, preferably 1 to 4 carbon atoms, an phenyl or naphthyl group, a group of formula H—$(OA'')_v$, wherein v is an integer in the range of 1 to 10, preferably between 1 to 6, and most preferably between 1 and 4 and A''O is an alkyleneoxy group containing from 2 to 4 carbon atoms, preferably 2 or 3 carbon atoms, more preferably 2 carbon atoms, and $HO(CH_2)_q$ and a group of formula (2)

wherein $R^8$ and $R^9$, independently from each other, are selected from among a hydrocarbyl group having 1 to 4 carbon atoms and q is an integer from 1 to 6, preferably q is 2 or 3, and/or $R^{11}$ is $R^1$-$(G)_y$- wherein $R^1$ is selected from the group consisting of a hydrocarbyl group having 10 to 24 carbon atoms, preferably 12 to 24 carbon atoms, and a group of formula $R^4$—O-$(A'O)_w$-T-, wherein $R^4$ is a hydrocarbyl group having 12 to 24 carbon atoms, w represents an integer ranging from 0 to 20, preferably from 0 to 10, more preferably from 0 to 6, and even more preferably from 0 to 4, A'O is an alkyleneoxy group containing 2 to 4 carbon atoms, preferably 2 or 3 carbon atoms, more preferably 2 carbon atoms, T is alkylene with 1 to 6 carbon atoms, preferably 1 to 4 carbon atoms, most preferably 2 or 3 carbon atoms, y is an integer from 0 to 5, preferably from 0 to 3, more preferably y is 0 or 1, most preferably y is 0 and G represents a group of formula (3):

wherein

B is selected from the group consisting of $C_1$-$C_4$ alkyl, aryl and arylalkyl group, preferably is a phenyl or phenylalkyl and most preferably is benzyl, s is 1, 2 or 3, preferably 2 or 3 and t is as defined in the first embodiment.

According to another embodiment, the compound of formula (1) is characterized in that $R^2$ is selected from the group consisting of a divalent hydrocarbyl radical having from 1 to 10, preferably from 2 to 6, and most preferably 4 carbon atoms, $R^7$ is a hydrocarbyl group having 1 to 4 carbon atoms, preferably 1 to 2 carbon atoms and most preferably $R^7$ is methyl, $R^{11}$ is $R^1$-$(G)_y$- wherein $R^1$ is a hydrocarbyl group having 8 to 24 carbon atoms, preferably 12 to 24 carbon atoms and y=0

QO is an ethoxy group and p, $q_1$, $q_2$, $q_3$, $q_4$, t, $R^5$ and X are as defined in the first embodiment, preferably as defined in the above embodiment.

According to another embodiment, the compound of formula (1) of the above embodiment is characterized in that p is a number within the range from 1 to 10, and/or t is 1, and/or $q_1$, $q_2$, $q_3$, $q_4$, are independently from each other an integer in the range from 1 to 6, and/or $R^5$ is selected from the group consisting of methyl and ethyl, and/or X is selected from the group consisting of halogens and sulphates.

According to another embodiment, the compound of formula (1) possesses at least one of the following characteristics:

- $R^1$ is derived from a fatty amine selected from the group consisting of 2-ethylhexyl amine, 2-propylheptyl amine, n-octyl amine, n-decyl amine, n-dodecyl amine, (coco alkyl) amine, (palm oil alkyl) amine, n-tetradecyl amine, n-hexadecyl amine, n octadecyl amine, oleyl amine, (tallow alkyl) amine, (hydrogenated tallow alkyl) amine, (rape seed alkyl) amine, (soya alkyl) amine, erucyl amine, N-(n-decyl)-N-methyl-trimethylene diamine, N-(n-dodecyl)-N-methyl-trimethylene diamine, N-(coco alkyl)-N-methyl-trimethylene diamine, N-(rape seed alkyl)-N-methyl-trimethylene diamine, N (soya alkyl)-N-methyl-trimethylene diamine, N-(tallow alkyl)-N-methyl-trimethylene diamine, N-(hydrogenated tallow alkyl)-N-methyl-trimethylene diamine, N-erucyl-N-methyl trimethylene diamine, isotridecyloxypropylamine, and mixtures thereof, and/or
- $R^2$ is derived from a dicarboxylic acid, a dicarboxylic acid chloride, a diester of a dicarboxylic acid, an anhydride of a dicarboxylic acid, an cyclic anhydride of a dicarboxylic acid, preferably R2 is derived from a compound selected from the group consisting of oxalic acid, malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides or cyclic anhydrides of these compounds and mixtures thereof, and/or
- $R^7$ is derived from an (alkyl)alkanolamine selected from the group consisting of triethanolamine, methyldiethanolamine, ethyldiethanolamine, propyldiethanolamine, butyldiethanolamine, isobutyldiethanolamine, pentyldiethanolamine, phenyl-diethanolamine, hexyldiethanolamine, heptyl diethanolamine, and mixtures thereof.

According to another embodiment, the collector agent of step b) consists of one or more compounds of formula (1).

According to another embodiment, the aqueous suspension obtained in step c) has a pH from 7 to 10, preferably from 7.2 to 9.5 and more preferably from 7.5 to 9.0.

According to another embodiment, the collecting agent is added in step c) in an amount of from 1 to 5 000 ppm based on the total dry weight of the white pigment and impurities containing material of step a), preferably in an amount of from 20 to 2 000 ppm, more preferably in an amount of from 30 to 1 000 ppm, and most preferably in an amount of from 50 to 800 ppm based on the total dry weight of said white pigment and impurities containing material of step a).

According to another embodiment, the aqueous suspension obtained in step c) has a solids content of between 5 and 80 wt.-% based on the total weight of the solids in the suspension, preferably of between 10 and 70 wt.-%, more preferably of between 20 and 60 wt.-% and most preferably of between 25 and 55 wt.-% based on the total weight of the solids in the suspension.

According to another embodiment, one or more additives are added to the aqueous suspension prior to, during or after step c), wherein the additives are selected from the group comprising pH-adjusting agents, solvents, depressants, activators, polyelectrolytes, frothers and collector agents other than the collector agents according to formula (1).

According to another embodiment, the aqueous suspension obtained in step c) is ground during and/or after step c).

According to another embodiment, the gas in step d) is air.

According to another embodiment, the suspension in step d) has a temperature of between 5 and 50° C., preferably between 10 and 40° C., more preferably between 10 and 35° C. and most preferably between 15 and 30° C.

According to another embodiment, the white pigment bearing phase obtained from step e) is dispersed and/or ground before and/or after step e) and preferably is dispersed and/or ground in the presence of at least one dispersing agent and/or at least one grinding aid agent.

A "pigment" in the meaning of the present invention is a solid colouring material having a defined chemical composition and a characteristic crystalline structure. Pigments can be inorganic pigments. Pigments may be synthetic or natural pigments. Furthermore, pigments are insoluble in water and, thus, resulting in a suspension when contacting them with water.

A "white pigment" in the meaning of the present invention is a pigment that has a white appearance when illuminated by daylight.

A "white mineral pigment" in the meaning of the present invention is an inorganic white pigment that may be obtained naturally and specifically includes natural calcium carbonate or ground calcium carbonate (in particular limestone, chalk, marble, calcite), calcium carbonate-comprising mineral material (may be with a 70 wt.-% minimum content of $CaCO_3$, based on the weight of the mineral), dolomite, barite, aluminium oxide, titanium dioxide and mixtures of the foregoing.

An "alkaline earth metal carbonate" in the meaning of the present invention is a carbonate that comprises at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$.

"Calcium carbonate" in the meaning of the present invention includes natural calcium carbonate and may be a ground calcium carbonate (GCC).

"Natural calcium carbonate" in the meaning of the present invention is a calcium carbonate (calcite) obtained from natural sources, such as marble, limestone, or chalk.

"Ground calcium carbonate" (GCC) in the meaning of the present invention is a natural calcium carbonate that is processed through a wet and/or dry treatment such as grinding, screening and/or classification, for example by a cyclone or classifier.

"Impurities" in the meaning of the present invention are substances that differ from the chemical composition of the desired white pigment.

A "collector agent" in the meaning of the present invention is a chemical compound that is adsorbed by the envisaged particles either by chemisorption or by physisorption. The collector agent renders the surface of the impurities more hydrophobic.

A "gas" in the meaning of the present invention is a sample of matter that conforms to the shape of a container in which it is held and acquires a uniform density inside the container. If not confined to a container, gaseous matter, also known as vapour, will disperse into space. The term gas is also used in reference to the state, or condition, of matter having this property. A gas is composed of molecules that are in constant random motion. According to the present invention the compound has to be in a gaseous state at room temperature (20±2° C.) and at standard atmospheric pressure (101 325 Pa or 1.01325 bar).

A "suspension" or "slurry" in the meaning of the present invention comprises non-dissolved solids in an aqueous medium, and optionally further additives, and usually contains large amounts of solids and, thus, is more viscous and can be of higher density than the aqueous medium supporting the suspension.

The "particle size" of fine (i.e. a $d_{50}<5$ µm) white pigment and impurities containing material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size also known as weight median grain diameter, i.e. 50 wt.-% of all grains are bigger and the remaining 50 wt.-% are smaller than this particle size. For the purpose of the present invention the particle size of fine (i.e. a $d_{50}<5$ µm) white pigment and impurities containing material is specified as weight median particle size $d_{50}$ unless indicated otherwise. The $d_{98}$ value is the particle size at which 98 wt.-% of all particles are smaller than that particle size. Fine particle sizes (i.e. a $d_{50}<5$ µm) were determined by using a Sedigraph™ 5100 or 5120 instrument of Micromeritics Instrument Corporation. The method and the instrument are known to the skilled person and are commonly used to determine the particle size of fillers and pigments. The measurements were carried out in an aqueous solution of 0.1 wt.-% $Na_4P_2O_7$. The samples were dispersed using a high speed stirrer and sonicated.

The "particle size" of a coarse (i.e. a $d_{50}$ above 5 µm) white pigment and impurities containing material herein is described by its distribution of particle sizes $d_x$. Therein, the value $d_x$ represents the diameter relative to which x % by weight of the particles have diameters less than $d_x$. This means that, for example, the $d_{20}$ value is the particle size at which 20 wt.-% of all particles are smaller than that particle size. The $d_{50}$ value is thus the weight median particle size also known as weight median grain diameter, i.e. 50 wt.-% of all grains are bigger and the remaining 50 wt.-% are smaller than this particle size. For the purpose of the present invention the particle size of coarse (i.e. a $d_{50}>5$ µm) white pigment and impurities containing material is specified as weight median particle size $d_{50}$ unless indicated otherwise. The $d_{98}$ value is the particle size at which 98 wt.-% of all particles are smaller than that particle 15 size. Coarse particle sizes (i.e. a $d_{50}>5$ µm) were determined by using a Malvern Mastersizer 2000 Laser Diffraction System from the company Malvern, UK. The raw data obtained by the measurement are analysed using the Mie theory, with a defined RI (particle refractive index) of 1.57 and iRI (absorption index) of 0.005 and Malvern Application Software 5.60. The measurement was performed with an aqueous dispersion. For this purpose, the samples were dispersed using a high-speed stirrer. The weight determined particle size distribution may correspond to the volume determined particle size if the density of all the particles is equal.

A "specific surface area (SSA)" of a calcium carbonate product in the meaning of the present invention is defined as the solids surface area of a bulk dry sample, representative of all the distribution of particles present, divided by the mass of the bulk sample. As used herein the specific surface area is measured by adsorption using the BET isotherm (ISO 9277:2010) and is specified in $m^2/g$.

A "conventional flotation process" or a "direct flotation process" in the meaning of the present invention is a flotation process in which the desirable white pigments are directly floated and collected from the produced froth leaving behind a suspension containing the impurities.

A "reverse flotation process" or "indirect flotation process" in the meaning of the present invention is a flotation process in which the impurities are directly floated and collected from the produced froth leaving behind a suspension containing the desired white pigments.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" though such a limited understanding is always included by the terms "obtained" or "defined" as a preferred embodiment.

The inventive process for manufacturing white pigment containing products involves the provision of at least one "white pigment and impurities containing material" and at least one inventive collector agent. Said white pigment and impurities containing material and said collector agent are mixed in an aqueous environment to form an aqueous suspension. Afterwards or during mixing a gas is passed through the obtained aqueous suspension and the white pigment containing product is recovered by removing the white pigment bearing phase from the aqueous suspension obtained after passing the gas through the suspension.

In the following, details and preferred embodiments of the process for manufacturing white pigment containing products will be set out in more detail. It is to be understood that these embodiments or details apply also for the inventive use of the white pigment bearing phase also obtained by the inventive process.

The White Pigment and Impurities Containing Material

Step a) of the process of the invention refers to the provision of at least one white pigment and impurities containing mineral.

A white pigment in the meaning of the present invention is a pigment that has a white appearance when viewed in daylight. The white nature of the white pigments is predominately based on the relatively low light absorption in combination with an unselective light scattering of the visual light at the pigment-air interface. The white pigments according to the present invention are inorganic white pigments that may be obtained naturally and synthetically and specifically include natural calcium carbonate or ground calcium carbonate (in particular limestone, chalk, marble, calcite), calcium carbonate-comprising mineral material (can be with a 50 wt.-% minimum content of $CaCO_3$, based on the weight of the mineral), dolomite, barite, and mixtures of the foregoing.

Preferably, the white mineral pigment is an alkaline earth metal carbonate. Alkaline earth metal carbonates in the meaning of the present invention are carbonates that comprise at least one alkaline earth metal cation. The alkaline earth metals according to the present invention are beryllium $Be^{2+}$, magnesium $Mg^{2+}$, calcium $Ca^{2+}$, strontium $Sr^{2+}$, barium $Ba^{2+}$ and radium $Ra^{2+}$ and, preferably, magnesium and calcium. The alkaline earth metal carbonates in the meaning of the present invention are, for example, beryllium carbonate, magnesium carbonate, calcium carbonate, strontium carbonate, barium carbonate or radium carbonate.

According to one embodiment of the present invention, the alkaline earth metal carbonate consists of only one alkaline earth metal, for example, calcium. The alkaline earth metal carbonate may alternatively consist of a mixture of two alkaline earth metals as for example calcium and magnesium and, thus, the alkaline earth metal carbonate may be a calcium magnesium carbonate, e.g., dolomite. The alkaline earth metal carbonate may comprise a mixture of two or more alkaline earth metals. Additionally, the alkaline earth metal carbonate may comprise further cations as for example sodium in gaylussite (sodium calcium carbonate).

The white pigment may comprise more than one alkaline earth metal carbonate. For example, the white pigment may comprise one magnesium carbonate and one calcium carbonate. Alternatively, the white pigment may consist of only one alkaline earth metal carbonate.

Preferably, the alkaline earth metal carbonate may be a calcium carbonate.

Calcium carbonate or natural calcium carbonate is understood to be a naturally occurring form of calcium carbonate, mined from sedimentary rocks such as limestone or chalk, or from metamorphic marble rocks. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Calcium carbonate is almost exclusively of the calcite polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, aluminium oxide etc.

The source of calcium carbonate may be selected from marble, chalk, calcite, dolomite, limestone, or mixtures thereof. Preferably, the source of calcium carbonate may be selected from marble.

Preferably, the alkaline earth metal carbonate may be a ground calcium carbonate (GCC). Ground calcium carbonate (GCC) is understood to be obtained by grinding the calcium carbonate either dry or alternatively wet.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill or other such equipment known to the skilled person. In case calcium carbonate containing mineral powder comprises a wet ground calcium carbonate containing mineral material, the grinding step may be performed under conditions such that autogenous grinding takes place and/or by horizontal ball milling, and/or other such processes known to the skilled person.

Preferably, the white pigment may consist of only one ground calcium carbonate. Alternatively, the white pigment may consist of a mixture of two ground calcium carbonates selected from different sources of ground calcium carbonate. The white pigment may also comprise a mixture of two or more ground calcium carbonates selected from different sources of ground calcium carbonate. For example, the white pigment may comprise one GCC selected from dolomite and one GCC selected from calcite marble. Additionally, to the GCC the white pigment may comprise further white mineral pigments.

The white pigment and impurities containing material will contain white pigments as defined above and impurities. Impurities in the meaning of the present invention are substances that differ from the chemical composition of the white pigment and, therefore, are no white pigments.

The impurities to be removed or reduced by the process according to the present invention are compounds that have, for example a grey, black, brown, red, or yellow colour or any other colour affecting the white appearance of the white pigment material. Alternatively, the impurities to be removed or reduced have a white colour but have different physical properties than the white pigments and, therefore, adversely affect the white pigments.

According to one embodiment of the present invention, the white pigment containing material comprises impurities selected from the group consisting of base metal sulphides, iron oxides, graphite, silicates and mixtures thereof.

According to a preferred embodiment the starting material, e.g., the white pigment and impurities containing material may comprise impurities selected from base metal sulphides such as iron sulphides.

Base metal sulphides in the meaning of the present invention are understood to be chemical compounds of a base metal and sulphur comprising a wide range of stochiometric formulae and different crystalline structures. Base metals according to the present invention are metals that oxidize, tarnish or corrode relatively easily when exposed to air or moisture. Known base metals are, for example, aluminium, copper, nickel, tin, zinc or iron. According to one embodiment of the present invention the base metal sulphide is selected from the group consisting of copper sulphide, nickel sulphide, tin sulphide, zinc sulphide, iron sulphide and/or mixtures thereof. According to a preferred embodiment the base metal sulphide is an iron sulphide.

Iron sulphides or iron sulphates in the meaning of the present invention are understood to be chemical compounds of iron and sulphur comprising a wide range of stochiometric formulae and different crystalline structures. For example the iron sulphide can be iron(II) sulphide FeS (magnetopyrite) or pyrrhotite $Fe_{1-x}S$ wherein x is from 0 to 0.2. The iron sulphide can also be an iron(II) disulphide $FeS_2$ (pyrite or marcasite). The iron sulphides can also contain other elements then iron and sulphur as for example nickel in the form of mackinawite $(Fe, Ni)_{1+x}S$ wherein x is from 0 to 0.1.

The impurities in the white pigment and impurities containing material may also be iron oxides.

Iron oxides in the meaning of the present invention are understood to be chemical compounds composed of iron and oxide. Iron oxide comprises, for example iron(II) oxide FeO, also known as wüstite, iron(I,III) oxides $Fe_3O_4$, also known as magnetite and iron(III) oxide $Fe_2O_3$. The iron oxides include also iron hydroxides and iron oxyhydroxides that contain beneath the elements iron and oxygen, the additional element hydrogen. Iron hydroxide comprises, for example iron(II) hydroxide $Fe(OH)_2$ and iron(III) hydroxide $Fe(OH)_3$, also known as bernalite. Iron oxyhydroxide comprises, for example α-FeOOH also known as goethite forming prismatic needle-like crystals, γ-FeOOH also known as lepidocrocite forming orthorhombic crystal structures, δ-FeOOH also known as feroxyhyte crystallizing in the hexagonal system and ferrihydrite FeOOH.4H$_2$O. The iron oxides can also contain additional elements as, for example, sulphur in Fe$_8$O$_8$(OH)$_6$(SO$_4$).nH$_2$O also known as schwertmannite or chloride in FeO(OH,Cl) also known as akaganeite.

The white pigment and impurities containing material may comprise impurities that are selected from graphite. Graphite in the meaning of the present invention is understood to be an allotrope of carbon. There are three principal types of natural graphite: crystalline flake graphite, amorphous graphite and lump graphite.

Alternatively the impurities in the white pigment and impurities containing material may be silicates. The silicates may be colouring or abrasive. Silicates or silicate minerals in the meaning of the present invention are understood to be compounds that comprise silicon and oxygen. Additionally, the silicates can comprises further ions such as for example aluminium ions, magnesium ions, iron ions or calcium ions.

The silicates and silicate minerals can be selected from neosilicates, sorosilicates, cyclosilicates, inosilicates, phyllosilicates, and tectosilicates and amorphous silicates.

The silicate may be selected from the group consisting of quartz, mica, amphibole, feldspar, clay mineral and mixtures thereof and, preferably, may be quartz.

The inventive process is especially contemplated for separating white pigments from impurities that consist of quartz and/or additional silicates.

Preferably the impurity in the white pigments and impurities containing material consists only of quartz.

Alternatively, the impurity or impurities in the white pigment and impurities containing material may comprise silicates that have a white colour. For example, the impurities may comprise silicates such as wollastonite, kaolin, kaolinitic clay, montmorillonite, talc, diatomaceous earth or sepiolite. In a preferred embodiment of the invention, the impurity consists of silicates that have a white colour and more preferably the impurity consists of only one white coloured silicate. For example, the impurity may consist only of wollastonite, kaolin, kaolinitic clay, calcines kaolinitic clay, montmorillonite, talc, diatomaceous earth or sepiolite. These impurities obtained and separated according to the inventive flotation method may be further processed and used in suitable applications. The impurities containing only white coloured silicates and, preferably containing only one white coloured silicate obtained by the inventive process may be used in the same way than the white pigment containing product.

In a preferred embodiment, the amount of white pigment in the white pigment and impurities containing material of step a) may be from 0.1 to 99.9 wt.-%, based on the dry weight, preferably from 30 to 99.7 wt.-%, more preferably from 60 to 99.3 wt.-% and most preferably from 80 to 99 wt.-%, based on the dry weight.

In another preferred embodiment, the weight ratio of white pigment:impurities in the white pigment and impurities containing material of step a) may be from 0.1:99.9 to 99.9:0.1, based on the dry weight, preferably from 30:70 to 99.7:0.3, more preferably from 60:40 to 99.3:0.7, and most preferably from 80:20 to 99:1, based on the dry weight.

The total amount of the white pigment and the impurities in the white pigment and impurities containing material of step a) may represent at least 90 wt.-% relative to the total weight of the white pigment and impurities containing material, preferably at least 95 wt.-%, more preferably at least 98 wt.-%, and most preferably at least 99 wt.-% relative to the total weight of the white pigment and impurities containing material.

As set out before, in a preferred embodiment the impurity in the white pigment and impurities containing material may consist of a silicate. In this case, the total amount of the white pigment and the silicate in the white pigment and impurities containing material of step a) represents at least 90 wt.-% relative to the total weight of the white pigment and impurities containing material, preferably at least 95 wt.-%, more preferably at least 98 wt.-%, and most preferably for at least 99 wt.-%.

Alternatively, the white pigment and impurities containing material may consist of white pigment and silicate. Preferably, the white pigment and impurities containing material may consist of white pigment and quartz. Alternatively, the white pigment and impurities containing material may consist of white pigment and a white coloured silicate that is selected from the group consisting of wollastonite, kaolin, kaolinitic clay, calcines kaolinitic clay, montmorillonite, talc, diatomaceous earth or sepiolite.

The white pigment and impurities containing material of step a) may have a weight median grain diameter in the range of from 1 to 5 000 μm, preferably of from 3 to 15 700 μm, more preferably of from 5 to 500 μm and most preferably of from 10 to 80 μm or from 100 to 500 μm.

In another preferred embodiment the white pigment and impurities containing material of step a) may have a weight median grain diameter in the range of from 1 to 5 000 μm, preferably of from 3 to 500 μm, more preferably of from 5 to 100 μm and most preferably of from 10 to 80 μm if the subsequent flotation process is a standard flotation process. A standard flotation process in the meaning of the present invention is a flotation process that is performed after grinding and/or classification of the white pigment and impurities containing material.

In another preferred embodiment the white pigment and impurities containing material of step a) may have a weight median grain diameter in the range of from 1 to 5 000 μm, preferably of from 10 to 700 μm, more preferably of from 50 to 500 μm and most preferably of from 100 to 500 μm if the subsequent flotation process is a coarse flotation process. A coarse flotation process in the meaning of the present invention is a flotation process that is performed within the first grinding loop of the white pigment and impurities containing material.

The Collector Agent

Step b) of the process of the present invention refers to the provision of at least one collector agent.

A collector agent in the meaning of the present invention is a chemical compound that is adsorbed by the envisaged particles either by chemisorption or by physisorption. The collector agents according to the present invention have the general formula (1),

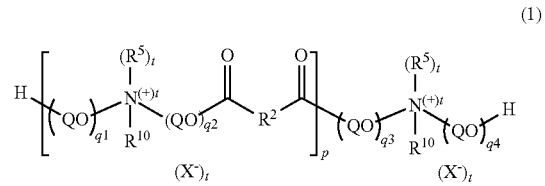

(1)

wherein R² is selected from the group consisting of:
i) a direct bond,
ii) a C₁-C₂₀, linear or branched, saturated or unsaturated hydrocarbon chain optionally substituted by one or more —OH group(s), a substituted alkylene radical wherein said alkylene radical is substituted by 1 or 2 —OH groups, an alkenylene radical having from 1 to 20 carbon atoms, and a substituted alkenylene radical, wherein said alkenylene radical is substituted by 1 or 2 methyl and/or methylene groups,
iii) a cycloalkylene,
iv) a cycloalkenylene and
v) an arylene group
$R^5$ is a $C_1$-$C_6$ hydrocarbyl group,
X is a leaving group,
t is 0 or 1,
p is an integer in the range from 1 to 15,
QO is an alkyleneoxy group containing from 2 to 4 carbon atoms,
$q_1$, $q_2$, $q_3$, $q_4$, are independently from each other an integer in the range from 1 to 20,
$R^{10}$ is independently from each other selected from the group consisting of $R^7$ and $R^{11}$, with the provisio that at least one of the $R^{10}$ groups is $R^7$ and at least one other of the $R^{10}$ groups is $R^{11}$, wherein
    $R^7$ is selected from the group consisting of a hydrocarbyl group having 1 to 7 carbon atoms, an aryl or an arylalkyl group, a group of formula H—(OA")$_v$-, wherein v represents an integer of between 1 and 20 and A"O represents an alkyleneoxy group containing from 2 to 4 carbon atoms, HO(CH₂)$_q$— and a group of formula (2)

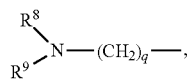  (2)

wherein $R^8$ and $R^9$, independently from each other, are selected from among a hydrocarbyl group having 1 to 6 carbon atoms, or $R^8$ and $R^9$, together with the nitrogen atom to which they are linked form a 5-, 6- or 7-atom ring, optionally bearing one or more heteroatom(s) chosen from among oxygen, nitrogen or sulphur and wherein q is an integer in the range from 1 to 10 $R^{11}$ is $R^1$-(G)$_y$- wherein $R^1$ is selected from the group consisting of a hydrocarbyl group having 8 to 24 carbon atoms and a group of formula $R^4$—O-(A'O)$_w$-T-, wherein $R^4$ is a hydrocarbyl group having from 8 to 24 carbon atoms, w is an integer in the range from 0 to 20, A'O is an alkyleneoxy group having from 2 to 4 carbon atoms, T is an alkylene group having from 1 to 6 carbon atoms, y is an integer from 0 to 5, and G represents a group of formula (3):

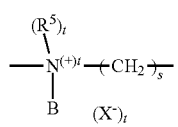  (3)

wherein
    B is selected from the group consisting of $C_1$-$C_4$ alkyl, aryl and arylalkyl group, s is 1, 2 or 3 and
$R^5$, X and t are as defined above,
    and the group (CH₂)$_s$ is a spacer between the two nitrogen atoms to which it is linked,
It is to be understood that the nitrogen atom in formula (1) and (3) has a positive charge when t=1 but is neutral when t=0.
The term "hydrocarbyl" according to the present invention refers to saturated or unsaturated, linear or branched hydrocarbon chains.
According to a preferred embodiment of the present invention, the compound of formula (1) is characterized in that
    $R^2$ is selected from the group consisting of an alkylene radical of formula —(CH₂)$_z$—, in which z is an integer from 1 to 20, preferably from 1 to 10, preferably from 2 to 6, and most preferably 4 and an alkenylene radical having from 1 to 10 carbon atoms, and/or
    $R^5$ is selected from the group consisting of a $C_1$-$C_4$ alkyl group, phenyl and phenylalkyl, and preferably is a benzyl, and/or
    X is selected from the group consisting of halogens, sulphates and carbonates, and/or
    p is an integer in the range from 1 to 10, preferably from 1 to 5, and/or
    QO is an alkyleneoxy group containing 2 or 3 carbon atoms, preferably containing 2 carbon atoms, and/or
    $q_1$, $q_2$, $q_3$, $q_4$, are independently from each other an integer of between 1 to 10, more preferably between 1 to 6, and most preferably between 1 to 4, and/or
    $R^7$ is selected from the group consisting of a hydrocarbyl group having 1 to 6 carbon atoms, preferably 1 to 4 carbon atoms, an phenyl or naphthyl group, a group of formula H—(OA")$_v$-, wherein v is an integer in the range of 1 to 10, preferably between 1 to 6, and most preferably between 1 and 4 and A"O is an alkyleneoxy group containing from 2 to 4 carbon atoms, preferably 2 or 3 carbon atoms, more preferably 2 carbon atoms, and HO(CH₂)$_q$— and a group of formula (2)

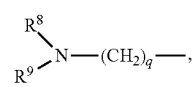  (2)

wherein $R^8$ and $R^9$, independently from each other, are selected from among a hydrocarbyl group having 1 to 4 carbon atoms and q is an integer from 1 to 6, preferably q is 2 or 3, and/or
    $R^{11}$ is $R^1$-(G)$_y$- wherein $R^1$ is selected from the group consisting of a hydrocarbyl group having 10 to 24 carbon atoms, preferably 12 to 24 carbon atoms, and a group of formula $R^4$—O-(A'O)$_w$-T-, wherein $R^4$ is a hydrocarbyl group having 12 to 24 carbon atoms, w represents an integer ranging from 0 to 20, preferably from 0 to 10, more preferably from 0 to 6, and even more preferably from 0 to 4, A'O is an alkyleneoxy group containing 2 to 4 carbon atoms, preferably 2 or 3 carbon atoms, more preferably 2 carbon atoms, T is alkylene with 1 to 6 carbon atoms, preferably 1 to 4 carbon atoms, most preferably 2 or 3 carbon atoms, y is an integer from 0 to 5, preferably from 0 to 3, more preferably y is 0 or 1, most preferably y is 0 and G represents a group of formula (3):

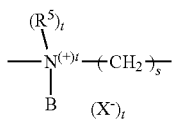

(3)

wherein
B is selected from the group consisting of $C_1$-$C_4$ alkyl, aryl and arylalkyl group, preferably is a phenyl or phenylalkyl and most preferably is benzyl,
s is 1, 2 or 3, preferably 2 or 3
and t is as defined above.

According to a preferred embodiment of the present invention, the compound of formula (1) is characterized in that
$R^2$ is selected from the group consisting of an alkylene radical of formula —$(CH_2)_z$—, in which z is an integer from 1 to 20, preferably from 1 to 10, preferably from 2 to 6, and most preferably 4 and an alkenylene radical having from 1 to 10 carbon atoms,
$R^5$ is selected from the group consisting of a $C_1$-$C_4$ alkyl group, phenyl and phenylalkyl, and preferably is a benzyl,
X is selected from the group consisting of halogens, sulphates and carbonates,
p is an integer in the range from 1 to 10, preferably from 1 to 5,
QO is an alkyleneoxy group containing 2 or 3 carbon atoms, preferably containing 2 carbon atoms,
$q_1$, $q_2$, $q_3$, $q_4$, are independently from each other an integer of between 1 to 10, more preferably between 1 to 6, and most preferably between 1 to 4,
$R^7$ is selected from the group consisting of a hydrocarbyl group having 1 to 6 carbon atoms, preferably 1 to 4 carbon atoms, an phenyl or naphthyl group, a group of formula H—$(OA'')_v$-, wherein v is an integer in the range of 1 to 10, preferably between 1 to 6, and most preferably between 1 and 4 and A''O is an alkyleneoxy group containing from 2 to 4 carbon atoms, preferably 2 or 3 carbon atoms, more preferably 2 carbon atoms, and HO$(CH_2)_q$— and a group of formula (2)

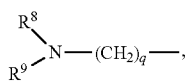

(2)

wherein $R^8$ and $R^9$, independently from each other, are selected from among a hydrocarbyl group having 1 to 4 carbon atoms and q is an integer from 1 to 6, preferably q is 2 or 3,
$R^{11}$ is $R^1$-$(G)_y$- wherein $R^1$ is selected from the group consisting of a hydrocarbyl group having 10 to 24 carbon atoms, preferably 12 to 24 carbon atoms, and a group of formula $R^4$—O-$(A'O)_w$-T-, wherein $R^4$ is a hydrocarbyl group having 12 to 24 carbon atoms, w represents an integer ranging from 0 to 20, preferably from 0 to 10, more preferably from 0 to 6, and even more preferably from 0 to 4, A'O is an alkyleneoxy group containing 2 to 4 carbon atoms, preferably 2 or 3 carbon atoms, more preferably 2 carbon atoms, T is alkylene with 1 to 6 carbon atoms, preferably 1 to 4 carbon atoms, most preferably 2 or 3 carbon atoms, y is an integer from 0 to 5, preferably from 0 to 3, more preferably y is 0 or 1, most preferably y is 0 and G represents a group of formula (3):

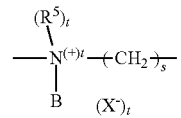

(3)

wherein
B is selected from the group consisting of $C_1$-$C_4$ alkyl, aryl and arylalkyl group, preferably is a phenyl or phenylalkyl and most preferably is benzyl,
s is 1, 2 or 3, preferably 2 or 3
and t is 0 or 1.

According to another preferred embodiment of the present invention, the compound of formula (1) is characterized in that
$R^2$ is selected from the group consisting of an alkylene radical of formula —$(CH_2)_z$—, in which z is an integer from 1 to 20, preferably from 1 to 10, preferably from 2 to 6, and most preferably 4 and an alkenylene radical having from 1 to 10 carbon atoms, or
$R^5$ is selected from the group consisting of a $C_1$-$C_4$ alkyl group, phenyl and phenylalkyl, and preferably is a benzyl, or
X is selected from the group consisting of halogens, sulphates and carbonates, or
p is an integer in the range from 1 to 10, preferably from 1 to 5, or
QO is an alkyleneoxy group containing 2 or 3 carbon atoms, preferably containing 2 carbon atoms, or
$q_1$, $q_2$, $q_3$, $q_4$, are independently from each other an integer of between 1 to 10, more preferably between 1 to 6, and most preferably between 1 to 4, or
$R^7$ is selected from the group consisting of a hydrocarbyl group having 1 to 6 carbon atoms, preferably 1 to 4 carbon atoms, an phenyl or naphthyl group, a group of formula H—$(OA'')_v$-, wherein v is an integer in the range of 1 to 10, preferably between 1 to 6, and most preferably between 1 and 4 and A''O is an alkyleneoxy group containing from 2 to 4 carbon atoms, preferably 2 or 3 carbon atoms, more preferably 2 carbon atoms, and HO$(CH_2)_q$— and a group of formula (2)

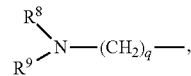

(2)

wherein $R^8$ and $R^9$, independently from each other, are selected from among a hydrocarbyl group having 1 to 4 carbon atoms and q is an integer from 1 to 6, preferably q is 2 or 3, or
$R^{11}$ is $R^1$-$(G)_y$- wherein $R^1$ is selected from the group consisting of a hydrocarbyl group having 10 to 24 carbon atoms, preferably 12 to 24 carbon atoms, and a group of formula $R^4$—O-$(A'O)_w$-T-, wherein $R^4$ is a hydrocarbyl group having 12 to 24 carbon atoms, w represents an integer ranging from 0 to 20, preferably from 0 to 10, more preferably from 0 to 6, and even more preferably from 0 to 4, A'O is an alkyleneoxy group containing 2 to 4 carbon atoms, preferably 2 or 3 carbon atoms, more preferably 2 carbon atoms, T is alkylene with 1 to 6 carbon atoms, preferably 1 to 4 carbon atoms, most preferably 2 or 3 carbon atoms, y is an integer from 0 to 5, preferably from 0 to 3, more preferably y is 0 or 1, most preferably y is 0 and G represents a group of formula (3):

(3)

wherein
B is selected from the group consisting of $C_1$-$C_4$ alkyl, aryl and arylalkyl group, preferably is a phenyl or phenylalkyl and most preferably is benzyl,
s is 1, 2 or 3, preferably 2 or 3
and t is 0 or 1.

According to another preferred embodiment of the present invention the compound of formula (1) is characterized in that
$R^2$ is selected from the group consisting of a divalent hydrocarbyl radical having from 1 to 10, preferably from 2 to 6, and most preferably 4 carbon atoms,
$R^7$ is a hydrocarbyl group having 1 to 4 carbon atoms, preferably 1 to 2 carbon atoms and most preferably $R^7$ is methyl,
$R^{11}$ is $R^1$-$(G)_y$- wherein $R^1$ is a hydrocarbyl group having 8 to 24 carbon atoms, preferably 12 to 24 carbon atoms and y=0
QO is an ethoxy group and
p, $q_1$, $q_2$, $q_3$, $q_4$, t, $R^5$ and X are as defined above, preferably as defined in claim 1 and most preferably as defined in claim 11.

According to another embodiment of the present invention, the compound of formula (1) is characterized as above and, furthermore,
p is a number within the range from 1 to 10, and/or
t is 1, and/or
$q_1$, $q_2$, $q_3$, $q_4$, are independently from each other an integer in the range from 1 to 6, and/or
$R^5$ is selected from the group consisting of methyl and ethyl, and/or
X is selected from the group consisting of halogens and sulphates.

According to another preferred embodiment of the present invention the compound of formula (1) is characterized in that
$R^2$ is selected from the group consisting of a divalent hydrocarbyl radical having from 1 to 10, preferably from 2 to 6, and most preferably 4 carbon atoms,
$R^7$ is a hydrocarbyl group having 1 to 4 carbon atoms, preferably 1 to 2 carbon atoms and most preferably $R^7$ is methyl,
$R^{11}$ is $R^1$-$(G)_y$- wherein $R^1$ is a hydrocarbyl group having 8 to 24 carbon atoms, preferably 12 to 24 carbon atoms and y=0
QO is an ethoxy group and/or
p is a number within the range from 1 to 10, and/or
t is 1, and/or
$q_1$, $q_2$, $q_3$, $q_4$, are independently from each other an integer in the range from 1 to 6, and/or
$R^5$ is selected from the group consisting of methyl and ethyl, and/or
X is selected from the group consisting of halogens and sulphates.

According to another preferred embodiment of the present invention the compound of formula (1) is characterized in that
$R^2$ is selected from the group consisting of a divalent hydrocarbyl radical having from 1 to 10, preferably from 2 to 6, and most preferably 4 carbon atoms,
$R^7$ is a hydrocarbyl group having 1 to 4 carbon atoms, preferably 1 to 2 carbon atoms and most preferably $R^7$ is methyl,
$R^{11}$ is $R^1$-$(G)_y$- wherein $R^1$ is a hydrocarbyl group having 8 to 24 carbon atoms, preferably 12 to 24 carbon atoms and y=0
QO is an ethoxy group,
p is a number within the range from 1 to 10,
t is 1,
$q_1$, $q_2$, $q_3$, $q_4$, are independently from each other an integer in the range from 1 to 6,
$R^5$ is selected from the group consisting of methyl and ethyl, and
X is selected from the group consisting of halogens and sulphates.

According to one embodiment of the present invention, the compound of formula (1) possesses at least one of the following characteristics:
$R^1$ is derived from a fatty amine selected from the group consisting of 2-ethylhexyl amine, 2-propylheptyl amine, n-octyl amine, n-decyl amine, n-dodecyl amine, (coco alkyl) amine, (palm oil alkyl) amine, n-tetradecyl amine, n-hexadecyl amine, n octadecyl amine, oleyl amine, (tallow alkyl) amine, (hydrogenated tallow alkyl) amine, (rape seed alkyl) amine, (soya alkyl) amine, erucyl amine, N-(n-decyl)-N-methyl-trimethylene diamine, N-(n-dodecyl)-N-methyl-trimethylene diamine, N-(coco alkyl)-N-methyl-trimethylene diamine, N-(rape seed alkyl)-N-methyl-trimethylene diamine, N (soya alkyl)-N-methyl-trimethylene diamine, N-(tallow alkyl)-N-methyl-trimethylene diamine, N-(hydrogenated tallow alkyl)-N-methyl-trimethylene diamine, N-erucyl-N-methyl trimethylene diamine, isotridecyloxy-propylamine, and mixtures thereof, and/or
$R^2$ is derived from a dicarboxylic acid, a dicarboxylic acid chloride, a diester of a dicarboxylic acid, an anhydride of a dicarboxylic acid, an cyclic anhydride of a dicarboxylic acid, preferably $R^2$ is derived from a compound selected from the group consisting of oxalic acid, malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the corresponding acid chlorides, methyl or ethyl esters or anhydrides or cyclic anhydrides of these compounds and mixtures thereof, and/or
$R^7$ is derived from an (alkyl)alkanolamine selected from the group consisting of triethanolamine, methyldiethanolamine, ethyldiethanolamine, propyldiethanolamine, butyldiethanolamine, isobutyldiethanolamine, pentyldiethanolamine, phenyl-diethanolamine, hexyldiethanolamine, heptyl diethanolamine, and mixtures thereof.

The compound of formula (1) may be prepared according to known preparations techniques.

For example, compound of formula (1) may be easily obtained by esterification condensation of an alkoxylated fatty amine of formula (I), or of the partial or total quaternisation product of said alkoxylated fatty amine of formula (I) with a dicarboxylic acid, or derivative thereof, of formula (II) with an (alkyl)alkanolamine derivative of formula (III) or of the partial or total quaternisation product of said (alkyl)alkanolamine derivative of formula (III).

More precisely, compound of formula (1) may be easily obtained by esterification condensation of an alkoxylated fatty amine of formula (I), or of the partial or total quaternisation product of said alkoxylated fatty amine of formula (I)

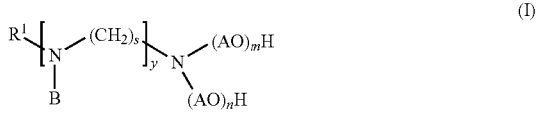

(I)

in which:
- $R^1$ is chosen from among a hydrocarbyl group having 8 to 24 carbon atoms, preferably 10 to 24, more preferably 12 to 24 carbon atoms, and a group of formula $R^4$—O—$(A'O)_w$-T-, wherein $R^4$ is a hydrocarbyl group having 8 to 24 carbon atoms, preferably 12 to 24 carbon atoms, w represents an integer ranging from 0 to 20, preferably from 0 to 10, more preferably from 0 to 6, and even more preferably from 0 to 4, A'O is an alkyleneoxy group containing 2 to 4 carbon atoms, preferably 2 or 3 carbon atoms, more preferably 2 carbon atoms; T is alkylene with 1 to 6 carbon atoms, preferably 1 to 4 carbon atoms, most preferably 2 or 3 carbon atoms,
- AO is an alkyleneoxy group containing 2 to 4 carbon atoms, preferably 2 or 3 carbon atoms, more preferably 2 carbon atoms,
- B is chosen from $C_1$-$C_4$ alkyl, aryl or arylalkyl group (e.g. phenyl, phenylalkyl, such as benzyl),
- m represents an integer of between 1 to 20, preferably between 1 to 10, more preferably between 1 to 6, and even more preferably between 1 to 4,
- n represents an integer of between 1 to 20, preferably between 1 to 10, more preferably between 1 to 6, and even more preferably between 1 to 4,
- s is 1, 2 or 3, preferably 2 or 3, and
- y is an integer from 0 to 5, preferably from 0 to 3, more preferably y is 0 or 1, still more preferably y is 0, with a dicarboxylic acid, or derivative thereof, of formula (II)

(II)

wherein
- D is chosen from among —F, —Cl, Br and —$OR^3$, where $R^3$ is hydrogen or $C_1$-$C_4$ alkyl group,
- $R^2$ is chosen from the group consisting of:
  - a direct bond,
  - a $C_1$-$C_{20}$, linear or branched, saturated or unsaturated hydrocarbon chain optionally substituted by one or more —OH group(s), preferably an alkylene radical of formula —$(CH_2)_z$—, in which z is an integer from 1 to 20, preferably from 1 to 10, preferably from 2 to 6, and most preferably 4, a substituted alkylene radical wherein said alkylene radical is substituted by 1 or 2 —OH groups, an alkenylene radical having from 1 to 20, preferably from 1 to 10 carbon atoms, a substituted alkenylene radical, wherein said alkenylene radical is substituted by 1 or 2 methyl and/or methylene groups,
  - a cycloalkylene,
  - a cycloalkenylene and
  - an arylene group with an (alkyl)alkanolamine derivative of formula (III) or of the partial or total quaternisation product of said (alkyl) alkanolamine derivative of formula (III)

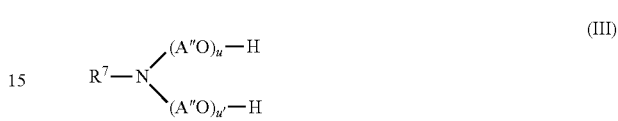

(III)

wherein:
- A"O represents an alkyleneoxy group containing from 2 to 4 carbon atoms, preferably 2 or 3 carbon atoms, more preferably 2 carbon atoms,
- u represents an integer of between 1 to 20, preferably between 1 to 10, more preferably between 1 to 6, and even more preferably between 1 to 4,
- u' represents an integer of between 1 to 20, preferably between 1 to 10, more preferably between 1 to 6, and even more preferably between 1 to 4,
- $R^7$ is chosen from among a hydrocarbyl group having 1 to 7, preferably 1 to 6 carbon atoms, more preferably 1 to 4 carbon atoms, an aryl or an arylalkyl group (e.g. phenyl or naphthyl group), a group of formula H—$(OA")_v$- (wherein v represents an integer of between 1 to 20, preferably between 1 to 10, more preferably between 1 to 6, and even more preferably between 1 to 4), $HO(CH_2)_q$— and a group of formula (IV)

(IV)

wherein $R^8$ and $R^9$, identical or different, are chosen from among a hydrocarbyl group having 1 to 6 carbon atoms, preferably 1 to 4 carbon atoms and q is an integer from 1 to 10, preferably from 2 to 6, and most preferably q is 2 or 3, or $R^8$ and $R^9$, together with the nitrogen atom to which they are linked form a 5-, 6- or 7-atom ring, optionally bearing one or more heteroatom(s) chosen from among oxygen, nitrogen or sulphur.

Optionally, said reaction between the alkoxylated fatty amine of formula (I), the dicarboxylic acid or derivative thereof of formula (II), and the (alkyl)alkanolamine derivative of formula (III) is being followed by a further reaction step, wherein part or all of the nitrogen atoms are quaternized by reaction with a reactant of formula $R^5X$, wherein $R^5$ is chosen from a $C_1$ to $C_6$ hydrocarbyl group, preferably a $C_1$ to $C_4$ alkyl group, phenyl and phenylalkyl, such as benzyl, and X is any leaving group known in the art, and preferably X is generally chosen from among halogens, sulphates, carbonates, and the like.

For example, the compound of formula (1) may be obtained by the esterification condensation as described above, wherein in the fatty amine of formula (I), $R^1$ bears 8 or more than 8 carbon atoms, typically from 8 to 24 carbon atoms, preferably from 10 to 24, more preferably from 12 to 24 carbon atoms, and in the (alkyl)alkanolamine derivative of formula (III), $R^7$ bears 6 or less carbon atoms, typically from 1 to 6 carbon atoms, more preferably 1 to 4 carbon atoms, Alternatively, the compound of formula (1) may be obtained by the esterification condensation as described above, wherein in the fatty amine of formula (I) and in the (alkyl)alkanolamine derivative of formula (III), $R^1$ and $R^7$ are such that the difference in the number of carbon atoms that they bear is more than 2, typically from 2 to 23, preferably 5 to 23, more preferably 10 to 23.

The dicarboxylic acids or derivatives thereof of formula (II) also include their corresponding anhydride forms. Furthermore, when the alkyleneoxy chain contains more than one alkyleneoxy group, the alkyleneoxy groups may be the same or different. Similarly, when y is greater than one, the repeating units may be identical or different.

The alkoxylated fatty amine of formula (I) may be of formula (IA):

(IA)

which is the alkoxylated fatty amine of formula (I) wherein y represents 0, and $R^1$, AO, m and n are as defined above, as well as its partially or totally quaternised corresponding derivatives.

Alkoxylated fatty amines of formula (I) are for example commercially available or may be prepared according to known process from the literature, and especially may be for example easily prepared by alkoxylation of fatty amines of formula (a):

(a)

wherein $R^1$, B, s and y are as defined above.

Illustrative examples of suitable fatty amines according to formula (a) for use as starting materials for the preparation of alkoxylated fatty amines of formula (I) include, but are not limited to, fatty amines of formula (a1) wherein y represents 0 and fatty amines of formula (a2) wherein y represents 1, s represents 3 and B represents methyl:

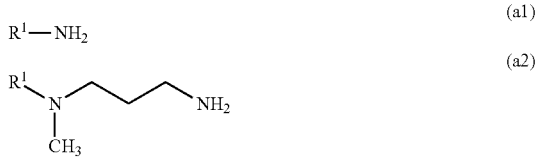

(a1)

(a2)

wherein $R^1$ is as defined above.

Particular examples of amines of formula (a1) are amines of formula (a3):

(a3), wherein $R^4$, and T are as defined above and w is 0.

More specific examples of the above-mentioned amines of formula (a) include, but are not limited to, 2-ethylhexyl amine, 2-propylheptyl amine, n-octyl amine, n-decyl amine, n-dodecyl amine, (coco alkyl) amine, (palm oil alkyl) amine, n-tetradecyl amine, n-hexadecyl amine, n octadecyl amine, oleyl amine, (tallow alkyl) amine, (hydrogenated tallow alkyl) amine, (rape seed alkyl) amine, (soya alkyl) amine, erucyl amine, N-(n-decyl)-N-methyl-trimethylene diamine, N-(n-dodecyl)-N-methyl-trimethylene diamine, N-(coco alkyl)-N-methyl-trimethylene diamine, N-(rape seed alkyl)-N-methyl-trimethylene diamine, N (soya alkyl)-N-methyl-trimethylene diamine, N-(tallow alkyl)-N-methyl-trimethylene diamine, N-(hydrogenated tallow alkyl)-N-methyl-trimethylene diamine, N-erucyl-N-methyl trimethylene diamine, and isotridecyloxypropylamine, as well as mixtures thereof.

Preferably, the above-mentioned amines are fatty amines obtained from natural (vegetable or animal) oils or acids and mixtures thereof, e.g. coco fatty acid, tallow fatty acid, rape seed oils, soya oils, palmoils. These fatty amines are then typically alkoxylated with 2 to 40, preferably 2 to 20, more preferably 2 to 12 and even more preferably 2 to 8 EO (ethyleneoxy units), and/or 2 to 40, preferably 2 to 20, more preferably 2 to 12 and even more preferably 2 to 8 PO (propyleneoxy units), and/or 2 to 40, preferably 2 to 20, more preferably 2 to 12 and even more preferably 2 to 8 BO (butyleneoxy units). Blocks with EO are generally added first and PO and/or BO last, or blocks with PO and/or BO added first and EO last, or with mixtures of EO and PO and/or BO to produce randomly alkoxylated products of the general formula (I). The alkoxylation may be performed by any suitable method known in the art by using e.g. an alkaline catalyst, such as potassium hydroxide (KOH), or an acid catalyst or even without catalyst.

Examples of commercial products of formula (I) include Noramox® SD20, Noramox® SD15, Noramox® S11, Noramox® S5, Noramox® S7, Noramox® S2, Noramox® SH2, Noramox® O2, Noramox® O5, Noramox® C2, Noramox® C5, Noramox® C15. All such commercial products are available from Arkema Other examples of commercial products of formula (I) include Tomamine® E-17-5 and Tomamine® E-T-2 available from Air Products.

The (alkyl)alkanolamine derivative of formula (III) may be of formula (IIIA):

(IIIA)

which is the (alkyl)alkanolamine of formula (III) wherein u and u' each represents 1, A"O is ethyleneoxy and $R^7$ is as defined above. In compound of formula (IIIA) above $R^7$ is preferably a hydrocarbyl group having 1 to 4 carbon atoms. Compound of formula (IIIA) above also encompasses its partially or totally quaternised corresponding derivatives.

(Alkyl)alkanolamine derivatives of formula (III) are either commercially available or may be prepared according to known process from the literature. Illustrative examples of suitable (alkyl)alkanolamines derivatives of formula (III) include, but are not limited to, triethanolamine, methyldiethanolamine, ethyldiethanolamine, propyldiethanolamine, butyldiethanolamine, isobutyldiethanolamine, pentyldiethanolamine, phenyldiethanolamine, hexyldiethanolamine, heptyl diethanolamine, as well as their corresponding alkoxylation products.

Other examples of amines suitable as starting material for the preparation of alkoxylated derivatives of formula (III) include, without limitation, methylamine, ethylamine, propylamines, butylamines, pentylamines, hexylamines, heptylamines, dimethylaminoethylamine, diethylaminoethylamine, dimethylaminopropylamine (DMAPA), diethylaminopropylamine (DEAPA), dipropylaminopropylamine, dibutylaminopropylamine (DBAPA), 1-(3-aminopropyl)-2-pyrolidine, 3-morpholinopropylamine, 1-(3-aminopropyl)piperidine, 1-(3-aminopropyl)pipecoline. Some of these alkoxylated derivatives of formula (III) are new and as such form part of the present invention.

The dicarboxylic acid derivative of general formula (II) may be any dicarboxylic acid or dicarboxylic acid derivative or anhydride known by the person skilled in the art, and typically a dicarboxylic acid, a dicarboxylic acid halide, e.g. chloride, a diester of a dicarboxylic acid, or a cyclic anhydride of a dicarboxylic acid. Most suitable derivatives are the dicarboxylic acids and their corresponding cyclic anhydrides. For example, the dicarboxylic acid derivatives of general formula (II) include oxalic acid, malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, their corresponding acid chlorides, their corresponding methyl or ethyl esters, and their corresponding cyclic anhydrides, as well as mixtures thereof, and preferably the dicarboxylic acid derivatives of general formula (II) are chosen from among oxalic acid, malonic acid, succinic acid, glutaric acid, adipic acid, pimelic acid, phthalic acid and its isomers, tetrahydrophthalic acid, malic acid, tartaric acid, itaconic acid, their corresponding acid chlorides, their corresponding methyl or ethyl esters, and their corresponding cyclic anhydrides, as well as mixtures thereof.

The product (1) that is used in the present invention can, for example, be prepared by mixing at least one compound of formula (II) with at least one compound of formula (III) as described above and at least one compound of formula (I) as described above, and running an esterification condensation reaction between the compounds in the mixture. Alternatively, compounds of formula (I), (II) and (III) are sequentially reacted together in different orders. For example, it is possible to run an esterification condensation reaction between compounds of formula (I) and (II) first and then run another esterification condensation reaction of this condensation product with compound of formula (III) in a further step. Another suitable method includes running an esterification condensation reaction between compounds of formula (II) and (III) first and then run another esterification condensation reaction of this condensation product with compound of formula (I) in a further step.

Alternatively, an esterification condensation reaction between:
a. condensation product of reaction between compounds of formula (II) and (III) and
b. condensation product of reaction between compounds of formula (I) and (II)
c. optionally running another esterification condensation reaction of the reaction product compounds of step a and step b above together with at least one compound of formula (I) and/or of formula (II) and/or formula (III) can be performed.

The molar ratio between reactants [(I)+(III)] and (II) can be, for example, 2:1 to 1:2, preferably 1.5:1 to 1:1.5, and most preferably 1.4:1 to 1:1.4. Alternatively, the molar ratio between reactants [(I)+(III)] and (II) can be, for example, 2:1 to 1:1, preferably 2:1 to 1.2:1, and most preferably 2:1 to 1.3:1. Alternatively, the molar ratio between (I) and (III) can be, for example, 15:1 to 1:15, preferably 10:1 to 1:10, more preferably 4:1 to 1:4, and most preferably 2:1 to 1:2.

The esterification condensation reactions taking place between the compounds of formula (II) and of formula (I) and formula (III) are well-known in the art. The reactions are preferably being performed in the presence of an esterification catalyst, such as a Brönstedt or Lewis acid, for example methanesulphonic acid, p-toluenesulphonic acid, hypophosphoric acid, citric acid or boron trifluoride ($BF_3$).

When a dicarboxylic acid derivative of formula (II) is used, wherein D is O—$R^3$, the reaction is a transesterification, which alternatively could be performed in the presence of an alkaline catalyst. Alternatively, other conventional techniques known by the person skilled in the art could be used starting from other derivatives of the dicarboxylic acids, such as from anhydrides or their acid chlorides.

The reactions could take place with or without solvents added. If solvents are present during the reaction, the solvents should be inert to esterification, e.g. toluene or xylene.

The esterification condensation reaction between the compounds (I), (II) and (III) may be realized at any temperature according to known operating conditions, and for example at a temperature typically ranging from 60° C. to 300° C., preferably from 120° C. to 280° C., and usually for a period of time ranging from 1 hour to several hours, preferably from 2 hours to 20 hours. The esterification condensation reaction may be realized under atmospheric pressure, alternatively said reaction may optionally be run at a reduced pressure, e.g. of from 500 Pa to 20000 Pa.

When all t are 0 in formula (1), the product is a tertiary polyesteramine compound, and when all t are 1 the product is a polyester polyquaternary ammonium compound, resulting from quaternisation of the compound where t is 0. As would be clear to a person skilled in the art, when part of the t are 0 and part of the t are 1, the product is a partially quaternised polyesteramine compound. For the quaternisation reaction step, preferred alkylating agents are chosen from among compounds of formula $R^5X$. Illustrative examples of such alkylating agents include, but are not limited to, methyl chloride, methyl bromide, methyl iodide, dimethyl sulphate, diethyl sulphate, dimethyl carbonate and benzyl chloride, the most preferred alkylating agents being methyl chloride, dimethyl sulphate, diethyl sulfate or benzyl chloride, and mixtures thereof, preferably methyl chloride and/or dimethylsulphate.

The quaternisation may be performed on the fatty amine of formula (I) and/or on the (alkyl)alkanolamine derivative of formula (III) prior running the esterification condensation reaction(s) with the dicarboxylic acid or derivative thereof of formula (II). Other alternatives include the quaternisation reaction on the intermediate compounds obtained during sequential or alternate esterification condensation reactions. Full or partial quaternisation reaction(s) may be realized after any of these intermediate steps.

Quaternisation reactions are generally performed in water and/or in organic solvent(s), such as ethanol, isopropanol (IPA), ethylene glycol monobutyl ether, di(ethylene glycol)

monobutyl ether (BDG), monoethylene glycol (MEG), diethylene glycol (DEG), or mixtures thereof. Preferred solvents are chosen from isopropanol (IPA), ethanol, and mixtures thereof. The reaction temperature of the quaternising reaction is suitably in the range of from 20° C. to 100° C., preferably at least 40° C., more preferably at least 50° C. and most preferably at least 55° C., and preferably at most 90° C. The quaternisation reaction is typically run for a period of time ranging from several tenths of minutes to several tenths of hours, preferably from one hour to 100 hours, still preferably from 1 hour to 30 hours.

The expression "totally quaternised" in the meaning of the present invention means that "all of the nitrogen atoms are quaternised" or that "all nitrogen atoms of the product are quaternary" which means that the total amount of basic nitrogen per gram of compound is less than or equal to 0.2 mmol, preferably less than or equal to 0.1 mmol, more preferably less than or equal to 0.05 mmol.

As a consequence the heating is preferably stopped when the amount of basic nitrogen is less or equal to 0.2 mmol/g, preferably less than or equal to 0.1 mmol/g, more preferably less than or equal to 0.05 mmol/g as can be e.g. measured by titration with 0.2 N hydrochloric acid or any other suitable method known in the art.

According to one preferred embodiment all nitrogen atoms of the product are quaternary.

According to a preferred embodiment of the present invention the collector agent of step b) is a polymer obtained from the simultaneous/sequential/alternate esterification condensation reaction(s) of:
- at least one compound of formula (I), wherein y=0, and $R^1$ is chosen from among a hydrocarbyl group having 8-24 carbon atoms, preferably 10 to 24, more preferably 12 to 24 carbon atoms,
- at least one compound of formula (II), and
- at least one compound of formula (III), wherein $R^7$ is a hydrocarbyl group having 1 to 7, preferably 1 to 6 carbon atoms, more preferably 1 to 4 carbon atoms, as well as their partial or total quaternisation reaction products.

According to another preferred embodiment of the present invention the collector agent of step b) is a polymer obtained from the simultaneous/sequential/alternate esterification condensation reaction(s) of:
- at least one compound of formula (I), wherein y=0, $R^1$ is chosen from among a hydrocarbyl group having 8-24 carbon atoms, preferably 10 to 24, more preferably 12 to 24 carbon atoms and AO is ethoxy,
- at least one compound of formula (II), and
- at least one compound of formula (III), wherein $R^7$ is a hydrocarbyl group having 1 to 7, preferably 1 to 6 carbon atoms, more preferably 1 to 4 carbon atoms, and A"O is ethoxy, as well as their partial or total quaternisation reaction products.

According to another preferred embodiment of the present invention the collector agent of step b) is a polymer obtained from the simultaneous/sequential/alternate esterification condensation reaction(s) of:
- at least one compound of formula (I), wherein y=0, $R^1$ is chosen from among a hydrocarbyl group having 8-24 carbon atoms, preferably 10 to 24, more preferably 12 to 24 carbon atoms, AO is ethoxy, and m and n, each independently from one another, identical or different, represent an integer of between 1 to 10, preferably 1 to 6, more preferably 1 to 4, limits inclusive,
- at least one compound of formula (II), chosen from diacids (D represents —OH) and their corresponding anhydrides, wherein $R^2$ is a divalent hydrocarbyl radical having from 1 to 14, more preferably from 1 to 10, even more preferably from 1 to 8 carbon atoms, limits inclusive, and
- at least one compound of formula (III), wherein $R^7$ is a hydrocarbyl group having 1 to 7, preferably 1 to 6 carbon atoms, more preferably 1 to 4 carbon atoms, A"O is ethoxy, and u and u' each represent 1, as well as their total quaternisation reaction products with methyl chloride. According to a preferred embodiment of the present invention the collector agent of step b) is a polymer obtained from the simultaneous/sequential/alternate esterification condensation reaction(s) of:
- at least one compound of formula (I) chosen from among n-octyl amine, n-decyl amine, n-dodecyl amine, (coco alkyl) amine, (palm oil alkyl) amine, n-tetradecyl amine, n-hexadecyl amine, n-octadecyl amine, oleyl amine, (tallow alkyl) amine, (hydrogenated tallow alkyl) amine, (rape seed alkyl) amine, (soya alkyl) amine, erucyl amine, alkoxylated with 2 to 20, preferably 2 to 10 EO (ethyleneoxy units), and/or 2 to 20, preferably 2 to 10 PO (propyleneoxy units),
- at least one compound of formula (II) chosen from among malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, their corresponding acid chlorides, their corresponding methyl or ethyl esters, and their corresponding cyclic anhydrides, as well as mixtures thereof, and
- at least one compound of formula (III) chosen from among methyldiethanolamine, ethyldiethanolamine, propyldiethanolamine, butyldiethanolamine, isobutyl diethanolamine, pentyldiethanolamine, hexyldiethanolamine, heptyl diethanolamine, as well as their corresponding alkoxylation products, as well as their partial or total quaternisation reaction products.

According to another preferred embodiment of the present invention the collector agent of step b) is a polymer obtained from the simultaneous/sequential/alternate esterification condensation reaction(s) of:
- at least one compound of formula (I) chosen from among n-dodecyl amine, (coco alkyl) amine, (palm oil alkyl) amine, n-tetradecyl amine, n-hexadecyl amine, n-octadecyl amine, oleyl amine, (tallow alkyl) amine, (hydrogenated tallow alkyl) amine, (rape seed alkyl) amine, (soya alkyl) amine, erucyl amine, alkoxylated with 2 to 20, preferably 2 to 10 EO (ethyleneoxy units),
- at least one compound of formula (II) chosen from among malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, their corresponding acid chlorides, their corresponding methyl or ethyl esters, and their corresponding cyclic anhydrides, as well as mixtures thereof, and
- at least one compound of formula (III) chosen from among methyldiethanolamine, ethyldiethanolamine, propyldiethanolamine, butyldiethanolamine, isobutyl diethanolamine, pentyldiethanolamine, hexyldiethanolamine, heptyl diethanolamine, as well as their corresponding ethoxylation products, as well as their partial or total quaternisation reaction products.

According to another preferred embodiment of the present invention the collector agent of step b) is a polymer obtained from the simultaneous/sequential/alternate esterification condensation reaction(s) of:

- at least one compound of formula (I) chosen from among n-dodecyl amine, (coco alkyl) amine, (palm oil alkyl) amine, n-tetradecyl amine, n-hexadecyl amine, n-octadecyl amine, oleyl amine, (tallow alkyl) amine, (hydrogenated tallow alkyl) amine, (rape seed alkyl) amine, (soya alkyl) amine, erucyl amine, alkoxylated with 2 to 20, preferably 2 to 10 EO (ethyleneoxy units),
- at least one compound of formula (II) chosen from among malonic acid, succinic acid, glutaric acid, adipic acid, pimelic acid, maleic acid, fumaric acid, suberic acid, sebacic acid, azelaic acid, brassylic acid, dodecanedioic acid, their corresponding cyclic anhydrides, and
- at least one compound of formula (III) chosen from among methyldiethanolamine, ethyldiethanolamine, propyldiethanolamine, butyldiethanolamine, isobutyl diethanol amine, pentyldiethanolamine, hexyldiethanolamine, heptyl diethanolamine, as well as their total quaternisation reaction products with methyl chloride.

According to a preferred embodiment of the present invention, the collector agent of step b) consists of one or more compounds of formula (1).

According to another preferred embodiment of the present invention the collector agent of step b) is a polymer of ethoxylated tallow amine (5OE) with adipic acid. Such a polymer is prepared in the experimental section in Example 2 as product B.

Step c) of the Process of the Invention

Step c) of the process of the invention refers to mixing said white pigment and impurities containing material of step a) and said collector agent of step b), in an aqueous environment to form an aqueous suspension.

According to one embodiment of the present invention the at least one white pigment and impurities containing material of step a) may be mixed, in a first step, with water, and then, the obtained suspension may be mixed with the collector agent of step b) to form an aqueous suspension.

The collector agent of step b) may be mixed, in a first step, with water, and then, the obtained suspension may be mixed with the at least one white pigment and impurities containing material of step a) to form an aqueous suspension.

According to another embodiment of the present invention, the at least one white pigment and impurities containing material of step a) and the collector agent of step b) may be mixed in one step with water to form an aqueous suspension.

Preferably, mixing may be carried out using a wet mill, a mixing tank, a feeding pump or a flotation agitator for mixing the collector into the aqueous suspension.

The mixing may be carried out at room temperature, i.e. at 20° C.±2° C., or at other temperatures. According to one embodiment the mixing may be carried out at a temperature from 5 to 40° C., preferably from 10 to 30° C. and most preferably from 15° C. to 25° C., or at other temperatures. Heat may be introduced by internal shear or by an external source or a combination thereof.

The solids content of the aqueous suspension obtained by the inventive method can be adjusted by the methods known to the skilled person. To adjust the solids content of an aqueous white pigments and impurities containing material comprising suspension, the suspension may be partially or fully dewatered by a filtration, centrifugation or thermal separation process. Alternatively, water may be added to the white pigment and impurities containing material until the desired solids content is obtained. Additionally or alternatively, a suspension having an appropriate lower content of a white pigment and impurities containing material may be added to the aqueous suspension until the desired solid content is obtained.

According to a preferred embodiment, of the present invention the aqueous suspension obtained in step c) has a solids content measured as described in the Examples section hereafter of between 5 and 80 wt.-% based on the total weight of the solids in the suspension, preferably of between 10 and 70 wt.-%, more preferably of between 20 and 60 wt.-% and most preferably of between 25 and 55 wt.-%, based on the total weight of the solids in the suspension.

The aqueous suspension obtained in step c) may have a pH from 7 to 10, preferably from 7.2 to 9.5 and more preferably from 7.5 to 9.0.

According to one embodiment of the present invention, the collecting agent is added in step c) in an amount of from 1 to 5 000 ppm based on the total dry weight of the white pigment and impurities containing material of step a), preferably in an amount of from 20 to 2 000 ppm, more preferably in an amount of from 30 to 1 000 ppm, and most preferably in an amount of from 50 to 800 ppm based on the total dry weight of said white pigment and impurities containing material of step a).

According to one embodiment of the present invention, one or more additives are added to the aqueous suspension prior to, during or after step c), wherein the additives are selected from the group comprising pH-adjusting agents, solvents, depressants, activators, polyelectrolytes, frothers and collector agents other than the collector agents according to formula (1).

Additionally to the white pigment and impurities containing material a) and the collector agent b), one or more further additives may be present in the aqueous suspension. Possible additives are, for example pH-adjusting agents, solvents (water, organic solvent(s) and mixtures thereof); depressants, such as starch, quebracho, tannin, dextrin and guar gum, activators such as copper sulfate in combination with sphalerite, pyrite, pyrrhotite and other sulfates, and polyelectrolytes, such as polyphosphates and water glass, which have a dispersant effect, often combined with a depressant effect. Other conventional additives that are known in the art of flotation are frothers (foaming agents), such as methyl isobutyl carbinol, triethoxy butane, pine oil, terpineol and polypropylene oxide and its alkyl ethers, among which methyl isobutyl carbinol, triethoxy butane, pine oil, terpineol, are preferred frothers. By way of non-limiting examples, preferred conventional additives are generally frothers, among which terpineol is the most commonly used.

Furthermore, one or more other conventional collector agents known in the art of flotation, and preferably one or more conventional cationic collector agents may be in the aqueous suspension formed in step c). Preferred conventional cationic collector agents are those containing no sulphur atoms, and most preferred are those containing only carbon, nitrogen and hydrogen atoms and optionally oxygen atoms. Conventional cationic collector agents, in the form of their addition salts with acids, may however contain sulphur atom(s), when the salifying acid itself comprises sulphur atom(s), e.g. sulphuric, sulphonic or alkane sulphonic acid.

Examples of conventional cationic collector agents that may be present in the suspension obtained from step c) may include, but are not limited to fatty amines and their salts, as well as their alkoxylated derivatives, fatty poly(alkylene amines) and their salts, e.g. poly(ethylene amines), poly(propylene amines) and their salts, as well as their alkoxylated derivatives, fatty amidopolyamines, and their salts, as well as their alkoxylated derivatives, fatty amidopoly(alkyleneamines), and their salts, as well as their alkoxylated derivatives, fatty imidazolines and their salts, as well as their alkoxylated derivatives, N-fatty alkyl amino carboxylic acid and their salts, e.g. N-fatty alkyl amino propionic acid and their salts, alkyl ether amines and alkyl ether diamines and their salts, quaternary ammonium compounds, e.g. fatty quaternary ammonium compounds, mono(fatty alkyl) quaternary ammonium compounds, di(fatty alkyl) quaternary ammonium compounds, such as those described in WO 2007/122148 A1, and the like.

A "polyamine" in the meaning of the present invention is a compound comprising two or more amine groups, the amine groups possibly being substituted, i.e. the two or more amine groups may be identical or different and be primary, secondary or tertiary amine groups.

Specific examples of conventional cationic collector agents that may be present in the suspension obtained from step c) may include, without any limitation, dicoco-dimethyl ammonium chloride (CAS RN 61789-77-3), coco-dimethylbenzyl ammonium chloride (CAS RN 61789-71-7), tallow dimethyl benzyl ammonium chloride (CAS RN 61789-75-1), ethoxylated tallow monoamine, 1,3-propanediamine-N-tallow diacetate (CAS RN 68911-78-4), N,N',N'-tri-hydroxyethyl N-tallow propylene diamine (CAS RN 61790-85-0), N,N',N'-tri-hydroxyethyl N-oleyl propylene diamine (CAS RN 103625-43-0), N,N',N'-tri-hydroxyethyl N-lauryl propylene diamine (CAS RN 25725-44-4), fatty alkyl imidazoline obtained by condensation of diethylenetriamine and oleic fatty acid (CAS RN 162774-14-3), N,N',N'-tri-hydroxyethyl N-behenyl-propylene diamine (CAS RN 91001-82-0), isodecyloxypropyl-1,3-diaminopropane (CAS RN 72162-46-0), N,N-di(tallow carboxyethyl)-N-hydroxyethyl-N-methyl ammonium methylsulphate (CAS RN 91995-81-2), N-coco-β-aminopropionic acid (CAS RN 84812-94-2), N-lauryl-β-aminopropionic acid (CAS RN 1462-54-0), N-myristyl-β-aminopropionic acid (CAS RN 14960-08-8), their addition salts with acid(s), sodium salt of N-lauryl-3-aminopropionic acid (CAS RN 3546-96-1), triethanolamine salt of N-lauryl-3-aminopropionic acid (CAS RN 14171-00-7), triethanolamine salt of N-myristyl-3-aminopropionic acid (CAS RN 61791-98-8), as well as mixtures of two or more of the above compounds, in all proportions, and the like.

"Etheramines" and "etherdiamines" in the meaning of the present invention are compounds comprising at least one ether group and respectively a $NH_2$ terminal group and a $NH_2$ terminal group as well as another primary, secondary or tertiary amine group.

If there are additives and/or conventional collector agents in the suspension, the collector agent of the present invention may be present from 1 wt.-% to 100 wt.-%, more preferably from 10 wt.-% 100 wt.-%, typically from 20 wt.-% to 100 wt.-%, and advantageously from 1 wt.-% to 99 wt.-%, more preferably from 10 wt.-% to 99 wt.-%, typically from 20 wt.-% to 99 wt.-% relative to the total amount of the collector agent and the further additives.

According to one embodiment of the present invention, the aqueous suspension obtained in step c) is ground during and/or after step c).

The grinding step can be carried out with any conventional grinding device, for example by e.g. using a ball mill, a hammer mill, a rod mill, a vibrating mill, a roll crusher, a centrifugal impact mill, a vertical bead mill, an attrition mill, a pin mill, a hammer mill. However, any other device that is able to grind the aqueous suspension obtained in step c) during and/or after method step c) may be used.

Step d) of the Process of the Invention

Step d) of the process of the invention refers to passing a gas through the suspension formed in step c).

The gas may be generally introduced in the vessel of step d) via one or more entry ports located in the lower half of the vessel. Alternatively or additionally, the gas may be introduced via entry ports located on an agitation device in said vessel. The gas then naturally rises upwards through the suspension.

Preferably the gas in step d) is air.

The gas may have a bubble size in the suspension of between 0.01 and 10 mm, preferably of between 0.05 and 5 mm and most preferably between 0.1 and 2 mm.

The gas flow rate in step d) may be adjusted, e.g. between 0.1 and 30 $dm^3$/min, preferably between 1 and 10 $dm^3$/min and more preferably between 3 and 7 $dm^3$/min in a 4 $dm^3$ flotation cell.

According to a preferred embodiment of the invention, step d) may implement an agitation cell and/or a flotation column and/or a pneumatic flotation device and/or a flotation device featuring a gas injection.

According to a preferred embodiment of the present invention, the aqueous suspension in step d) may have a temperature of between 5 and 50° C., preferably between 10 and 40° C., more preferably of between 10 and 35° C. and most preferably between 15 and 30° C.

Step d) may be preferably performed under agitation. Furthermore, step d) may be continuous or discontinuous.

According to a preferred embodiment, step d) is performed until no more foam is formed or can be visually observed or until no more impurities can be collected in the foam.

Step e) of the Process of the Invention

Step e) of the process of the invention refers to recovering the white pigment containing product by removing the white pigment bearing phase from the aqueous suspension obtained after step d).

The inventive process comprises at least one indirect flotation step. In contrast to conventional flotation, in which the desirable white pigments are directly floated and collected from the produced froth, reverse or indirect flotation aims to have the undesirable impurities preferentially floated and removed, leaving behind a suspension that has been concentrated in the desirable white pigments. According to one embodiment of the present invention, the inventive process leads to the formation of a froth containing the impurities and a white pigment bearing phase with the white pigment containing product. The hydrophobised impurities are migrating to the surface of the suspension and are concentrated in a supernatant foam or froth at the surface. This foam can be collected by skimming it off the surface, using for example a scraper, or simply by allowing an overflowing of the foam, and passing the foam into a separate collection container. After collecting the foam, the white pigment-bearing phase containing the non-floated white pigment containing product will remain. The white pigment containing product remaining in the aqueous suspension can be collected by filtration to remove the aqueous phase partly or completely to a desired solids content, by decantation or by other means commonly employed in the art to separate liquids from solids.

The collected white pigment containing product can be subjected to one or more further steps of froth flotation, according to the invention or according to prior art froth flotation methods.

According to one embodiment of the present invention the white pigment bearing phase obtained from step e) is dispersed and/or ground before and/or after step e) and preferably is dispersed and/or ground in the presence of at least one dispersing agent and/or at least one grinding aid agent.

According to a preferred embodiment, the white pigment bearing phase obtained from step e) may be ground before and/or after step e).

The grinding step can be carried out with any conventional grinding device, for example by e.g. using a ball mill, a hammer mill, a rod mill, a vibrating mill, a roll crusher, a centrifugal impact mill, a vertical bead mill, an attrition mill, a pin mill, a hammer mill. However, any other device that is able to grind the white pigment containing product recovered during method step e) may be used.

According to a preferred embodiment of the present invention the grinding is done in the presence of at least one grinding agent. Grinding agents are known to the skilled person and are commercially available.

According to another embodiment, the white pigment bearing phase obtained from step e) may be dispersed before and/or after step e). The dispersing step can be carried out with any conventional dispersing device. According to a preferred embodiment of the present invention the dispersing is done in the presence of at least one dispersing agent. Dispersing agents are known to the skilled person and are commercially available.

Step e) of the inventive process may be followed by at least one grinding or classification step for example by wet grinding and screening to achieve a fine ground product slurry and/or at least one other treatment step.

The hydrophobised impurities obtained by the inventive process and, preferably the hydrophobised silicates that are contained in the foam can be collected as already set out above. In a preferred embodiment of the invention, the hydrophobised impurities may comprise silicates that have a white colour as for example wollastonite, kaolin, kaolinitic clay, calcines kaolinitic clay, montmorillonite, talc, diatomaceous earth or sepiolite. More preferably, the hydrophobised impurity consists of silicates that have a white colour and more preferably the impurity consists of only one white coloured silicate. For example, the impurity may consist only of wollastonite or kaolin or kaolinitic clay or montmorillonite or talc or diatomaceous earth or sepiolite. These impurities obtained and separated from the white pigments according to the inventive flotation method may be further processed and used in suitable applications. The impurities containing only silicates having a white appearance when illuminated by daylight and, preferably containing only one white silicate having a white appearance when illuminated by daylight obtained by the inventive process may be used in the same way than the white pigment containing product, for example in paper, plastics, paint, coatings, concrete, cement, cosmetic, water treatment, food, pharma, ink and/or agriculture applications.

White Pigment Containing Product Obtained by the Process of the Invention

In a preferred embodiment the white pigment containing product obtained by the process of the invention may comprise at least 95 wt.-% white pigments, based on the dry weight, preferably at least 98 wt.-%, more preferably at least 99 wt.-% and most preferably at least 99.9 wt.-%, based on the dry weight.

In another embodiment the white pigment containing product obtained by the process of the invention may comprise less than 60 ppm, preferably less than 35 ppm, more preferably less than 15 ppm and most preferably less than 5 ppm of collector agent or degradation products thereof based on the dry weight.

The white pigment containing product as well as the white pigment-bearing phase obtained by the inventive process can be used in paper, plastics, paint, coatings, concrete, cement, cosmetic, water treatment, food, pharma, ink and/or agriculture applications. Preferably, the white pigment containing product may be used in a wet end process of a paper machine, in cigarette paper, board, and/or coating applications, or as a support for rotogravure and/or offset and/or ink jet printing and/or continuous ink jet printing and/or flexography and/or electrophotography and/or decoration surfaces.

The scope and interest of the invention will be better understood based on the following examples which are intended to illustrate certain embodiments of the invention and are non-limitative.

EXAMPLES

1 Measurement Methods pH Measurement

The pH was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Aldrich). The reported pH values were the endpoint values detected by the instrument (the endpoint was when the measured signal differs by less than 0.1 mV from the average over the last 6 seconds).

Particle Size Distribution (Mass % Particles with a Diameter<X) and Weight Median Grain Diameter ($D_{50}$) of Particulate Material The Particle Size Distribution (PSD) and the correlating median grain diameter $d_{50}$ were measured by Laser Diffraction Analyzers; either by Malvern Mastersizer 2000 in case of a $d_{50}$ above 5 μm or by a Micromeritics Sedigraph™ 5120 in case of finer materials (<5 μm). The measurement was carried out in an aqueous solution of 0.1% by weight of $Na_4P_2O_7$ and the samples were dispersed using a high speed stirrer and ultrasonic before. While in the Sedigraph works via the sedimentation method, i.e. an analysis of sedimentation behaviour in a gravimetric field, the Mastersizer runs in a circulation mode.

Weight Solids (Wt.-%) of a Material in Suspension

The weight solids were determined by dividing the weight of the solid material by the total weight of the aqueous suspension. The weight of the solid material is determined by weighing the solid material obtained by evaporating the aqueous phase of suspension and drying the obtained material to a constant weight.

Specific Surface (BET) Measurement

The specific surface area (in $m^2/g$) of the white pigment or of the impurities was determined using nitrogen and the BET method, which is well known to the skilled person (ISO 9277:2010). The total surface area (in $m^2$) of the white pigment or of the impurities was then obtained by multiplication of the specific surface area and the mass (in g) of the white pigment or of the impurities. The method and the instrument are known to the skilled person and are commonly used to determine specific surface of white pigments or of the impurities.

Brightness Measurement and Yellow Index (=YI)

The samples from the flotation process were dried by use of microwave. The obtained dry powders were prepared in a powder press to get a flat surface and Tappi brightness (R457 ISO brightness) is measured according to ISO 2469 using an ELREPHO 3000 from the company Datacolor. The results for the Tappi brightness are given as percentage in comparison to a calibration standard.

The yellow index has been calculated by the following formula:

YI=100*($R_x$-$R_z$)/$R_y$)

Determination of the HCl Insoluble Content 10 g crude material (dry product or slurry under consideration of the solid content) were weighed into a 400 ml beaker, suspended in 50 ml demineralized (demin.) water and mixed with 40 ml HCl (8N=25%). After the formation of carbon dioxide has been finished the mixture was boiled for 5 minutes, cooled to room temperature and subsequently strained over a previously weighed membrane filter. The beaker wall was rinsed 3 times with 20 ml demin. water and afterwards the filter was dried at 105° C. in the microwave until weight constancy is reached. After the filter cooled down in the desiccator it was weighed back and the HCl insoluble (insol.) content was calculated according to following equation:

$$\text{HCl-insol.content[\% by weight]} = \frac{\text{filter gross [g]} - \text{filter tare [g]}}{\text{weighedsample[g](dry mass of slurry)}} \times 100\%$$

Determination of Load Capacity

The surface charge of the collector agent bearing particles in the slurry was measured by a Mütek Particle Charge Detector (PCD04 from BTG) using titration with sodium polyethylenesulphonate (Na-PES) in [μ Val/Kg].

Determination of the Acid Value

The acid value has been measured by potentiometric titration using potassium hydroxide solution as the reagent and isopropyl alcohol as a solvent.

In a 250 mL beaker, about 10 g of sample to analyze is precisely weighed (Sw, precision to the mg) and 70 mL of isopropyl alcohol are added. The mixture has been agitated and heated gently if necessary to get a homogeneous sample. The titrator combined glass reference electrode has been introduced into the solution, which has been then agitated with a magnetic stirrer. The acid-base titration of the sample has been performed using 0.1 N aqueous potassium hydroxide (KOH) solution and the pH evolution has been recorded on the titrator. The equivalent point has been graphically determined using methods known to the skilled in the art, and the volume (VKOH, in mL) of potassium hydroxide solution used to reach this point has been determined. The acid value (AV) has then been obtained according to the following calculation:

$$AV = \frac{[\text{Normality of KOH solution (mol/L)}] \times 56.1 \times V_{KOH}}{Sw}$$

Total Alkalinity Measurement Method

In all following examples, the total alkalinity value is measured by potentiometric titration using hydrochloric acid solution as the reagent and isopropyl alcohol as solvent. In a 100 mL polypropylene beaker, about 3 g of sample to analyse is precisely weighed to the mg (Sw, in g) and 60 mL of solvent are added. The mixture is agitated and heated gently if necessary to get a homogeneous sample. When the temperature of the solution is back to room temperature, the titrator combined glass reference electrode is introduced into the solution, which is then agitated with a magnetic stirrer. The titration of the sample is performed using a 0.2N aqueous hydrochloric acid (HCl) solution of precisely known Normality (n, in meq/ml) and the pH evolution is recorded on the titrator. The equivalent point is determined using methods known to the skilled in the art, and the volume (VHCl, in ml) of hydrochloric acid solution used to reach this point determined. The total alkalinity value (Alk) is then obtained according to the following calculation:

$$Alk \text{ (meq/g)} = \frac{VHCL*n}{Sw}$$

2 Collector Agents

Example 1: Synthesis of a Product A (According to the Invention)

1196.7 g (2.5 moles) of ethoxylated tallow amine (5OE) supplied by Arkema under the tradename Noramox® S5, 715.2 g (3.45 moles) of Methyldiethanolamine (>99%) supplied by Taminco and 0.5 g of a 50 wt % aqueous solution of hypophosphorous acid are introduced in a 4 L round bottom flask. The mixture is heated to 80° C. with nitrogen bubbling. The bubbling is stopped and 756.8 g (5.18 moles) of adipic acid are then introduced under agitation. After 15 minutes, the mixture temperature is raised up to 120° C. in a 1 hour time and the pressure in the vessel is progressively lowered until a pressure of 6.66 kPa (50 mm Hg) is reached. The temperature is raised up to 190° C. and temperature and pressure are maintained until almost all of the acid is consumed (Acid Value<5). The system is then cooled down to recover 2482.3 g of crude orange/brown liquid reaction product containing the sought esteramine (product A), non reacted amines and non reacted diacid.

Example 2: Synthesis of a Product B (According to the Invention)

1420.1 g (2.97 moles) of ethoxylated tallow amine (5OE) supplied by Arkema under the tradename Noramox® S5, 353.2 g (2.97 moles) of Methyldiethanolamine (>99%) supplied by Taminco and 0.5 g of a 50 wt % aqueous solution of hypophosphorous acid are introduced in a 4 L round bottom flask. The mixture is heated to 80° C. with nitrogen bubbling. The bubbling is stopped and 650 g (4.45 moles) of adipic acid are then introduced under agitation. After 15 minutes, the mixture temperature is raised up to 160° C. and maintained for 4 hours. The temperature is then raised up to 190° C. and temperature is maintained until almost all of the acid is consumed (Acid Value<5). The pressure in the vessel is then progressively lowered until a pressure of 6.66 kPa (50 mm Hg) is reached and temperature and pressure are maintained for 2 more hours. Afterwards, the system is cooled down and pressure is brought back to atmospheric in order to recover 2260 g of crude clear orange/brown liquid reaction product containing the sought esteramine (product B), non reacted amines and non reacted diacid.

Example 3: Synthesis of a Product C (According to the Invention)

2022 g of the esteramine product A obtained in example 1 and 453 g of isopropyl alcohol are introduced in a 6 L glass rector. Methyl chloride is added until the pressure in the vessel reaches 290 kPa. The temperature is maintained at 80° C.–85° C. until complete reaction has occurred. Complete reaction is achieved when the total alkalinity value is less or equal to 0.2 meq/g. The reactor is then let to cool down to 65° C. and the pressure is brought back to atmospheric. Nitrogen is bubbled during 2 hours in the mixture before recovering 2095.9 g of the crude brown reaction product (product C) still containing 6.7% by weight of isopropyl alcohol.

Example 4: Synthesis of a Product D (According to the Invention)

1803.7 g of the esteramine product B obtained in example 2 and 788.3 g of isopropyl alcohol are introduced in a 6 L glass reactor. Methyl chloride is added until the pressure in the vessel reaches 290 kPa. The temperature is maintained at 80° C.–85° C. until complete reaction has occurred. Complete reaction is achieved when the total alkalinity value is less or equal to 0.2 meq/g. The reactor is then let to cool down to 65° C. and the pressure back to atmospheric. Nitrogen is bubbled during 2 hours in the mixture before recovering 2206.6 g of the crude brown reaction product (product D) still containing 17.3% by weight of isopropyl alcohol.

Example 5: Synthesis of a Product E (According to the Invention)

595 g (5 M) of MDEA (methyldiethanolamine) and 6 g of KOH (50% water solution) is added in a 4 L dry autoclave. The reactor is then closed and filled with a nitrogen atmosphere and the seal is leak proofed. The MDEA and the catalyst is dried to less than 1000 ppm of water. The pressure is then increased to 75 MPA at 25° C. with nitrogen. The temperature in the reactor is then risen to 90° C. while stirring. Then the temperature is risen again to 120° C. and 40 to 50 g of ethylene oxide are added. Additional ethylene oxide, for a total of 1100 g (25 M) in total, is added during 3 hours at 140 to 150° C. After the addition of the ethylene oxide, we have observed a 30 min reaction time followed by a nitrogen stripping of the liquid phase. At the end of the reaction, the reactor is cooled down to 60° C. and 1655 g of MDEA 5 EO are obtained.

1420.3 g (2.97 moles) of ethoxylated tallow amine (50E) supplied by Arkema under the tradename Noramox® S5, 745.5 g (2.97 moles) of MDEA 50E (synthesized as indicated above) and 0.5 g of a 50 wt % aqueous solution of hypophosphorous acid are introduced in a 4 L round bottom flask. The mixture is heated to 80° C. with nitrogen bubbling. The bubbling is stopped and 650 g (4.45 moles) of adipic acid are then introduced under agitation. After 15 minutes, the mixture temperature is raised up to 160° C. and maintained for 4 hours. The temperature is then raised up to 190° C. and temperature is maintained until almost all of the acid is consumed (Acid Value<5). The pressure in the vessel is then progressively lowered until a pressure of 6.66 kPa (50 mm Hg) is reached and temperature and pressure are maintained for 2 more hours. Afterwards, the system is cooled down and pressure is brought back to atmospheric in order to recover 2654.5 g of crude clear orange/brown liquid reaction product containing the sought esteramine (product E), non reacted amines and non reacted diacid.

Example 6: Synthesis of a Product F (According to the Invention)

2050 g of the esteramine product E obtained in example 5 and 615 g of isopropyl alcohol are introduced in a 6 L glass reactor. Methyl chloride is added until the pressure in the vessel reaches 290 kPa. The temperature is maintained at 80° C.–85° C. until complete reaction has occurred. Complete reaction is achieved when the total alkalinity value is less or equal to 0.2 meq/g. The reactor is then let to cool down to 65° C. and the pressure back to atmospheric. Nitrogen is bubbled during 2 hours in the mixture before recovering 2496.9 g of the crude brown reaction product (product F) still containing 12.4% by weight of isopropyl alcohol.

Example 7: Synthesis of a Product G (According to the Invention)

510 g (5 M) of DMAPA (Dimethylaminopropylamine) and 5 g (1% weight) of water is added to a 4 L dry autoclave. The reactor is then closed and filled with a nitrogen atmosphere and the seal is leak proofed. The pressure is then increased to 100 kPa at 30° C. with nitrogen. The temperature in the reactor is then risen to 120° C. while stirring. 40 g of ethylene oxide are added. The temperature is regularly increased until the reaction starts. The additional ethylene oxide, for a total 1100 g (25 M), is added during 4 hours at 150 to 160° C. After the addition of the ethylene oxide, we have observed a 30 min reaction time followed by a nitrogen stripping of the liquid phase. At the end of the reaction, the reactor is cooled down to 60° C. and 1570 g of DMAPA 5 EO are obtained.

1196.1 g (2.5 moles) of ethoxylated tallow amine (50E) supplied by Arkema under the tradename Noramox® S5, 805.4 g (2.5 moles) of DMAPA 50E (synthesized as indicated above) and 0.5 g of a 50 wt % aqueous solution of hypophosphorous acid are introduced in a 4 L round bottom flask. The mixture is heated to 80° C. with nitrogen bubbling. The bubbling is stopped and 547.9 g (3.75 moles) of adipic acid are then introduced under agitation. After 15 minutes, the mixture temperature is raised up to 160° C. and maintained for 4 hours. The temperature is then raised up to 190° C. and temperature is maintained until almost all of the acid is consumed (Acid Value<5). The pressure in the vessel is then progressively lowered until a pressure of 6.66 kPa (50 mm Hg) is reached and temperature and pressure are maintained for 2 more hours. Afterwards, the system is cooled down and pressure is brought back to atmospheric in order to recover 2413.9 g of crude clear orange/brown liquid reaction product containing the sought esteramine (product G), non-reacted amines and non-reacted diacid.

Example 8: Synthesis of a Product H (According to the Invention)

2040 g of the esteramine product E obtained in example 5 and 600 g of isopropyl alcohol are introduced in a 6 L glass reactor. Methyl chloride is added until the pressure in the vessel reaches 290 kPa. The temperature is maintained at 80° C.-85° C. until complete reaction has occurred. Complete reaction is achieved when the total alkalinity value is less or equal to 0.2 meq/g. The reactor is then let to cool down to 65° C. and the pressure back to atmospheric. Nitrogen is bubbled during 2 hours in the mixture before recovering 2396.7 g of the crude brown reaction product (product H) still containing 12.9% by weight of isopropyl alcohol.

Example 9: Synthesis of Products I to R (According to the Invention)

Following the exact same process as in example 1, the following products have been prepared starting from the compounds indicated in Table 1:

TABLE 1

Compounds and quantities used to synthesize products I to R according to the invention

| alkoxylated fatty amine of formula (I) | Weight of (II) in g | dicarboxylic acid, or derivative of formula (II) | Weight of (II) in g | (alkyl) alkanolamine derivative of formula (III) | Weight of (III) in g | Product | Weight of product in g |
|---|---|---|---|---|---|---|---|
| NoxS5 | 717.7 | Ac. Ad. | 657.5 | MDEA | 932.9 | I | 2145.6 |
| NoxS5 | 956.9 | Ac. Ad. | 730.5 | MDEA | 829.2 | J | 2336.1 |
| NoxS5 | 1435.4 | Anh.Succ. | 450.5 | MDEA | 621.9 | K | 2345.4 |
| NoxS5 | 1435.4 | Anh. Male. | 441.5 | MDEA | 621.9 | L | 2336.2 |
| NoxS5 | 1435.4 | Ac.Seb. | 909.9 | MDEA | 621.9 | M | 2804.5 |
| NoxS2 | 1039.4 | Ac. Ad. | 657.5 | MDEA | 621.9 | N | 2156.3 |
| NoxS11 | 1446.4 | Ac. Ad. | 438.3 | MDEA | 414.6 | O | 2190.8 |
| NoxC5 | 1320.9 | Ac. Ad. | 657.5 | MDEA | 621.9 | P | 2437.7 |
| NoxS5 | 1435.4 | Ac. Ad. | 657.5 | TEA | 447.6 | Q | 2378.1 |
| NoxS11 | 1446.4 | Ac. Ad. | 438.3 | MDEA5OE | 502.0 | R | 2278.2 |

NoxS5 is the abbreviation for ethoxylated tallow amine (50E) supplied by Arkema under the tradename Noramox® S5

NoxS2 is the abbreviation for ethoxylated tallow amine (20E) supplied by Arkema under the tradename Noramox® S2

NoxS11 is the abbreviation for ethoxylated tallow amine (110E) supplied by Arkema under the tradename Noramox® S11

NoxC5 is the abbreviation for ethoxylated coco amine (50E) supplied by Arkema under the tradename Noramox® C5

MDEA is the abbreviation for Methyldiethanolamine (>99%) supplied by Taminco

TEA is the abbreviation for Triethanolamine (>99%) supplied by Taminco

MDEA is the abbreviation for Methyldiethanolamine (>99%) supplied by Taminco

MDEA 5 OE is prepared as explained in Example 5

Ac. Ad. is the abbreviation for Adipic acid, Anh. Succ. is the abbreviation for Succinic anhydride and Anh. Male. is the abbreviation for Maleic anhydride.

Example 10: Synthesis of Products S to AB (According to the Invention)

Following the exact same process as in Example 3, the chloromethyl quaternary ammonium derivatives of products I to R have been prepared starting from the compounds indicated in Table 2

TABLE 2

Compounds and quantities used to synthesize products S to AB according to the invention

| Reactant Product | Weight of product in g | Weight of Isopropanol in g | Product | Weight of product obtained in g | Isopropanol content of product (wt %) |
|---|---|---|---|---|---|
| I | 1800.2 | 540.1 | S | 2187.7 | 14.8% |
| J | 1900.5 | 570.2 | T | 2255.1 | 13.9% |
| K | 1900.2 | 570.1 | U | 2286.4 | 14.2% |
| L | 1900.1 | 570.0 | V | 2258.0 | 13.1% |
| M | 2200.3 | 660.1 | W | 2556.7 | 11.6% |
| N | 1800.4 | 540.1 | X | 2176.8 | 14.4% |
| O | 1800.1 | 540.0 | Y | 2111.6 | 12.8% |
| P | 2000.1 | 600.0 | Z | 2350.2 | 12.3% |
| Q | 2000.3 | 600.1 | AA | 2322.0 | 11.1% |
| R | 1800.4 | 540.1 | AB | 2142.7 | 14.1% |

3 Flotation Trials

All froth flotation trials were performed at room temperature (20+2° C.) in an Outotec laboratory flotation cell, equipped with a conical gassing agitator under agitation of 1 600 rpm under use of a 4 dm$^3$ capacity glass cell. The solids content of the aqueous white pigment and impurities containing material suspension added to the flotation machine was of 33% by dry weight, said white pigment and impurities containing material being sourced from sedimentary marble rock deposits with different origins, running already a flotation process. The used water was original tab water from each local flotation process.

A flotation gas, consisting of air, was then introduced via orifices situated along the axis of the agitator at a rate of approximately 2 dm$^3$/min.

The foam created at the surface of the suspension was separated from the suspension by overflow and skimming until no more foam could be collected, and both the remaining suspension and the collected foam were dewatered and dried in order to form two concentrates for mass balance and quality analyses like carbon fraction determination.

Comparative Examples are marked with a "CA" and Inventive Examples are marked with "IN". In the comparative Examples a known collector agent is used, commercially available under the tradename Lupromin FP 18 AS, from BASF. In the inventive Examples the collector agent B is used that has been prepared in Example 2.

Trial 1: HCL Impurities and Brightness Results

For tests No. 1 and 2 a white pigment and impurities containing material from Gummern marble deposit in Austria is selected. The material contains 2.3 wt.-% of impurities determined by HCl-insoluble determination. The material is crushed and pre-ground to a median grinding size $d_{50}$ of 23 µm. The material is treated according to the above-mentioned process. The test data are summarized in the following Tables 3 and 4.

TABLE 3

Flotation trials.

| | | Kinetic floatation trials-Dosage over time | | | |
|---|---|---|---|---|---|
| Test No. | Collector agent | Flotation time [minutes] | Total amount of collector agent added [ppm] | Incremental amount of collector added [ppm] | Impurities or HCl insoluble [wt.-%][a] |
| 1 | IN | 2 | 280 | 280 | 0.45 |
|   |    | 5 | 320 | 40 | 0.15 |
|   |    | 10 | 353 | 33 | 0.09 |
|   |    | 25 | 387 | 34 | 0.07 |
| 2 | CA | 2 | 280 | 280 | 1.83 |
|   |    | 4 | 380 | 100 | 1.21 |
|   |    | 6 | 473 | 93 | 0.72 |
|   |    | 10 | 520 | 47 | 0.33 |
|   |    | 15 | 567 | 47 | 0.15 |
|   |    | 25 | 600 | 33 | 0.09 |

[a] Impurities expressed as compounds insoluble in 8N HCl.

As can be gathered from the result of test No. 1 and 2 in tables 3 and 4 the inventive process for manufacturing white pigment comprising products shows good results (low amount of impurities in the white pigment containing product and high values for Tappi-brightness) even at low amounts of collector agent—within the aqueous suspension.

To investigate the quality of the product obtained after the flotation trial in test No. 1 and 2 as describe above, the brightness was measured.

TABLE 4 brightness results.

| Collector agent | Tappi-Brightness |
|---|---|
| IN | 93.5 |
| CA | 93.7 |

The results confirm that the collector agent according to the invention shows a desired brightness. The results shown in Table 4 above confirm the performance of the collector agent according to the invention.

The invention claimed is:

1. Process for manufacturing white pigment containing products, characterised in that said process comprises the following steps:
    a) providing at least one white pigment and impurities containing material;
    b) providing at least one collector agent selected from the group consisting of compounds of formula (1):

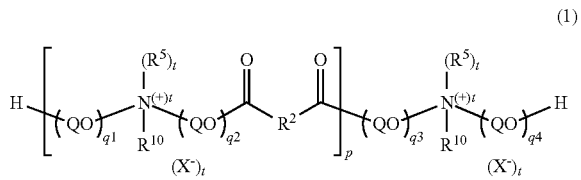

(1)

wherein $R^2$ is selected from the group consisting of:
i) a direct bond,
ii) a $C_1$-$C_{20}$, linear or branched, saturated or unsaturated hydrocarbon chain optionally substituted by one or more —OH group(s), a substituted alkylene radical wherein said alkylene radical is substituted by 1 or 2 —OH groups, an alkenylene radical having from 1 to 20 carbon atoms, and a substituted alkenylene radical, wherein said alkenylene radical is substituted by 1 or 2 methyl and/or methylene groups,
iii) a cycloalkylene,
iv) a cycloalkenylene and
v) an arylene group
$R^5$ is a $C_1$-$C_6$ hydrocarbyl group,
X is a leaving group,
t is 0 or 1,
p is an integer in the range from 1 to 15,
QO is an alkyleneoxy group containing from 2 to 4 carbon atoms,
$q_1$, $q_2$, $q_3$, $q_4$, are independently from each other an integer in the range from 1 to 20,
$R^{10}$ is independently from each other selected from the group consisting of $R^7$ and $R^{11}$, with the proviso that at least one of the $R^{10}$ groups is $R^7$ and at least one other of the $R^{10}$ groups is $R^{11}$, wherein
$R^7$ is selected from the group consisting of a hydrocarbyl group having 1 to 7 carbon atoms, an aryl or an arylalkyl group, a group of formula H—(OA")v-, wherein v represents an integer of between 1 and 20 and A"O represents an alkyleneoxy group containing from 2 to 4 carbon atoms, $HO(CH_2)_q$— and a group of formula (2)

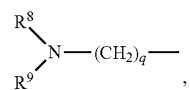

(2)

wherein $R^8$ and $R^9$, independently from each other, are selected from among a hydrocarbyl group having 1 to 6 carbon atoms, or $R^8$ and $R^9$, together with the nitrogen atom to which they are linked form a 5-, 6- or 7-atom ring, optionally bearing one or more heteroatom(s) chosen from among oxygen, nitrogen or sulphur and wherein q is an integer in the range from 1 to 10
$R^{11}$ is $R^1$-$(G)_y$- wherein $R^1$ is selected from the group consisting of a hydrocarbyl group having 8 to 24 carbon atoms and a group of formula $R^4$—O-(A'O)$_w$-T-, wherein $R^4$ is a hydrocarbyl group having from 8 to 24 carbon atoms, w is an integer in the range from 0 to 20, A'O is an alkyleneoxy group having from 2 to 4 carbon atoms, T is an alkylene group having from 1 to 6 carbon atoms, y is an integer from 0 to 5, and G represents a group of formula (3):

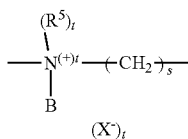 (3)

wherein
B is selected from the group consisting of C1-C4 alkyl, aryl and arylalkyl group,
s is 1, 2 or 3 and
$R^5$, X and t are as defined above,
and the group $(CH_2)_s$ is a spacer between the two nitrogen atoms to which it is linked,
c) mixing said white pigment and impurities containing material of step a) and said collector agent of step b) in an aqueous environment to form an aqueous suspension;
d) passing gas through the suspension formed in step c);
e) recovering the white pigment containing product by removing the white pigment bearing phase from the aqueous suspension obtained after step d).

2. Process according to claim 1, wherein the process involves an indirect flotation step leading to the formation of a froth containing the impurities and a white pigment bearing phase with the white pigment containing product.

3. Process according to claim 1, wherein the white pigment is a white mineral pigment.

4. Process according to claim 1, wherein the white pigment is an alkaline earth metal carbonate.

5. Process according to claim 1, wherein the white pigment containing material comprises impurities selected from the group consisting of base metal sulphides, iron oxides, graphite, silicates and mixtures thereof.

6. Process according to claim 5, wherein the silicate is selected from the group consisting of quartz, mica, amphibole, feldspar, clay mineral and mixtures thereof.

7. Process according to claim 5, wherein the silicate is a white coloured silicate selected from the group consisting of wollastonite, kaolin, kaolinitic clay, montmorillonite, talc, diatomaceous earth, sepiolite and mixtures thereof.

8. Process according to claim 1, wherein the amount of white pigment in the white pigment and impurities containing material of step a) is from 0.1 to 99.9 wt.-%, based on the dry weight.

9. Process according to claim 1, wherein the ratio of white pigment: impurities in the white pigment and impurities containing material of step a) is from 0.1:99.9 to 99.9:0.1, based on the dry weight.

10. Process according to claim 1, wherein the white pigment and impurities containing material of step a) has a weight median grain diameter in the range of from 1 to 5 000 μm.

11. Process according to claim 1, wherein the compound of formula (1) is characterized in that
$R^2$ is selected from the group consisting of an alkylene radical of formula $—(CH_2)_z—$, in which z is an integer from 1 to 20 and an alkenylene radical having from 1 to 10 carbon atoms, and/or
$R^5$ is selected from the group consisting of a $C_1$-$C_4$ alkyl group, phenyl and phenylalkyl, and/or X is selected from the group consisting of halogens, sulphates and carbonates, and/or
p is an integer in the range from 1 to 10, and/or
QO is an alkyleneoxy group containing 2 or 3 carbon atoms and/or
$q_1$, $q_2$, $q_3$, $q_4$, are independently from each other an integer of between 1 to 10, and/or
$R^7$ is selected from the group consisting of a hydrocarbyl group having 1 to 6 carbon atoms, an phenyl or naphthyl group, a group of formula H—(OA")$_v$-, wherein v is an integer in the range of 1 to 10, and A"O is an alkyleneoxy group containing from 2 to 4 carbon atoms, and HO(CH$_2$)$_q$— and a group of formula (2)

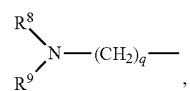 (2)

wherein $R^8$ and $R^9$, independently from each other, are selected from among a hydrocarbyl group having 1 to 4 carbon atoms and q is an integer from 1 to 6, and/or
$R^{11}$ is $R^1$-(G)$_y$- $R^1$ is selected from the group consisting of a hydrocarbyl group having 10 to 24 carbon atoms, and a group of formula $R^4$—O-(A'O)$_w$-T-, wherein $R^4$ is a hydrocarbyl group having 12 to 24 carbon atoms, w represents an integer ranging from 0 to 20, A'O is an alkyleneoxy group containing 2 to 4 carbon atoms, T is alkylene with 1 to 6 carbon atoms, y is an integer from 0 to 5, 0 or 1 and G represents a group of formula (3):

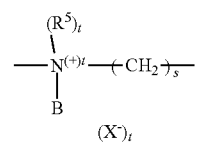 (3)

wherein
B is selected from the group consisting of $C_1$-$C_4$ alkyl, aryl and arylalkyl group,
s is 1, 2 or 3,
and t, is 0 or 1.

12. Process according to claim 1, wherein the compound of formula (1) is characterized in that
$R^2$ is selected from the group consisting of a divalent hydrocarbyl radical having from 1 to 10
$R^7$ is a hydrocarbyl group having 1 to 4 carbon atoms,
$R^{11}$ is $R^1$-(G)$_y$- $R^1$ is a hydrocarbyl group having 8 to 24 carbon atoms, and y=0
QO is an ethoxy group and
X is a leaving group.

13. Process according to claim 12, wherein the compound of formula (1) is characterized in that
p is a number within the range from 1 to 10, and/or
t is 1, and/or
$q_1$, $q_2$, $q_3$, $q_4$, are independently from each other an integer in the range from 1 to 6, and/or
$R^5$ is selected from the group consisting of methyl and ethyl, and/or
X is selected from the group consisting of halogens and sulphates.

14. Process according to claim 1, wherein the compound of formula (1) possesses at least one of the following characteristics:
  $R^1$ is derived from a fatty amine selected from the group consisting of 2-ethylhexyl amine, 2-propylheptyl amine, n-octyl amine, n-decyl amine, n-dodecyl amine, (coco alkyl) amine, (palm oil alkyl) amine, n-tetradecyl amine, n-hexadecyl amine, n octadecyl amine, oleyl amine, (tallow alkyl) amine, (hydrogenated tallow alkyl) amine, (rape seed alkyl) amine, (soya alkyl) amine, erucyl amine, N-(n-decyl)-N-methyl-trimethylene diamine, N-(n-dodecyl)-N-methyl-trimethylene diamine, N-(coco alkyl)-N-methyl-trimethylene diamine, N-(rape seed alkyl)-N-methyl-trimethylene diamine, N (soya alkyl)-N-methyl-trimethylene diamine, N-(tallow alkyl)-N-methyl-trimethylene diamine, N-(hydrogenated tallow alkyl)-N-methyl-trimethylene diamine, N-erucyl-N-methyl trimethylene diamine, isotridecyloxypropylamine, and mixtures thereof, and/or
  $R^2$ is derived from a dicarboxylic acid, a dicarboxylic acid chloride, a diester of a dicarboxylic acid, an anhydride of a dicarboxylic acid, an cyclic anhydride of a dicarboxylic acid, preferably $R^2$ is derived from a compound selected from the group consisting of oxalic acid, malonic acid, succinic acid, glutaric acid, glutaconic acid, adipic acid, muconic acid, pimelic acid, phthalic acid and its isomers, tetrahydrophthalic acid, malic acid, maleic acid, fumaric acid, suberic acid, mesaconic acid, sebacic acid, azelaic acid, tartaric acid, itaconic acid, glutinic acid, citraconic acid, brassylic acid, dodecanedioic acid, traumatic acid, thapsic acid, the correpesponding acid chlorides, methyl or ethyl esters or anhydrides or cyclic anhydrides of these compounds and mixtures thereof, and/or
  $R^7$ is derived from an (alkyl)alkanolamine selected from the group consisting of triethanolamine, methyldiethanolamine, ethyldiethanolamine, propyldiethanolamine, butyldiethanolamine, isobutyldiethanolamine, pentyldiethanolamine, phenyl-diethanolamine, hexyldiethanolamine, heptyl diethanolamine, and mixtures thereof.

15. Process according to claim 1, wherein the collector agent of step b) consists of one or more compounds of formula (1).

16. Process according to claim 1, wherein the aqueous suspension obtained in step c) has a pH from 7 to 10.

17. Process according to claim 1, wherein the collecting agent is added in step c) in an amount of from 1 to 5 000 ppm based on the total dry weight of the white pigment and impurities containing material of step a).

18. Process according to claim 1, wherein the aqueous suspension obtained in step c) has a solids content of between 5 and 80 wt.-% based on the total weight of the solids in the suspension.

19. Process according to claim 1, wherein one or more additives are added to the aqueous suspension prior to, during or after step c), wherein the additives are selected from the group comprising pH-adjusting agents, solvents, depressants, activators, polyelectrolytes, frothers and collector agents other than the collector agents according to formula (1).

20. Process according to claim 1, wherein the aqueous suspension obtained in step c) is ground during and/or after step c).

21. Process according to claim 1, wherein the gas in step d) is air.

22. Process according to claim 1, wherein the suspension in step d) has a temperature of between 5 and 50° C., preferably between 10 and 40° C.

23. Process according to claim 1, wherein the white pigment bearing phase obtained from step e) is dispersed and/or ground before and/or after step e).

24. Process according to claim 1, wherein the compound of formula (1) is characterized in that
  the white pigment is ground calcium carbonate
  the amount of white pigment in the white pigment and impurities containing material of step a) is from 80 to 99 wt.-% based on dry weight
  the ratio of white pigment impurities in the white pigment and impurities containing material of step a) is from 80:20 to 99:1 based on the dry weight
  the white pigment and impurities containing material of step a) has a median grain diameter in the range from 100 to 500 μm
  $R^2$ is selected from the group consisting of an alkylene radical of formula —$(CH_2)_z$—, in which z is an integer from 2 to 6 and an alkenylene radical having 4 carbon atoms, and/or
  $R^5$ is a benzl group and/or
  X is selected from the group consisting of halogens, sulphates and carbonates, and/or
  p is an integer in the range from 1 to 5, and/or
  QO is an alkyleneoxy group containing 2 carbon atoms and/or
  $q_1$, $q_2$, $q_3$, $q_4$, are independently from each other an integer of between 1 to 4, and/or
  $R^7$ is selected from the group consisting of a hydrocarbyl group having 1 to 4 carbon atoms, an phenyl or naphthyl group, a group of formula H—$(OA")_v$-, wherein v is an integer in the range of 1 to 4, and A"O is an alkyleneoxy group containing 2 carbon atoms, and HO$(CH_2)_q$— and a group of formula (2)

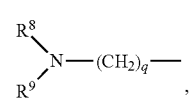

(2)

wherein $R^8$ and $R^9$, independently from each other, are selected from among a hydrocarbyl group having 1 to 4 carbon atoms and q is an integer from 2 to 3, and/or
  $R^{11}$ is $R^1$-$(G)_y$- wherein $R^1$ is selected from the group consisting of a hydrocarbyl group having 12 to 24 carbon atoms, and a group of formula $R^4$—O-$(A'O)_w$-T-, wherein $R^4$ is a hydrocarbyl group having 12 to 24 carbon atoms, w represents an integer ranging from 0 to 4, A'O is an alkyleneoxy group containing 2 carbon atoms, T is alkylene with 2 to 3 carbon atoms, y is an integer from 0 to 1, and G represents a group of formula (3):

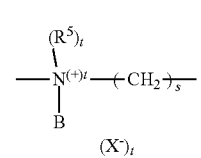

(3)

wherein

B is selected from the group consisting of $C_1$-$C_4$ alkyl, aryl and arylalkyl group, s is 1, 2 or 3 and t is 0 or 1 wherein the aqueous suspension obtained in step c) has a pH from 7.5 to 9.0 wherein the collecting agent is added in step c) in an amount of from 50 to 800 ppm based on the total dry weight of said white pigment and impurities containing material of step a)

wherein the aqueous suspension obtained in step c) has a solids content of between 25 and 55 wt.-% based on the total weight of the solids in the suspension and wherein the suspension in step d) has a temperature of between 15 and 30° C.

25. The process of claim 1, wherein y does not equal 0.

\* \* \* \* \*